(12) United States Patent
Panchaksharaiah et al.

(10) Patent No.: US 12,149,778 B2
(45) Date of Patent: Nov. 19, 2024

(54) SYSTEM AND METHOD FOR CLASSIFYING RECORDED CONTENT FOR DELETION

(71) Applicant: Adeia Guides Inc., San Jose, CA (US)

(72) Inventors: Vishwas Sharadanagar Panchaksharaiah, Karnataka (IN); Gaurav Gupta, Rajasthan (IN); Nimit Dineshbhai Kalaria, Gujarat (IN)

(73) Assignee: Adeia Guides Inc., San Jose, CA (US)

( * ) Notice: Subject to any disclaimer, the term of this patent is extended or adjusted under 35 U.S.C. 154(b) by 84 days.

(21) Appl. No.: 17/991,948

(22) Filed: Nov. 22, 2022

(65) Prior Publication Data
US 2023/0308711 A1    Sep. 28, 2023

Related U.S. Application Data

(63) Continuation of application No. 17/525,323, filed on Nov. 12, 2021, now Pat. No. 11,540,006, which is a
(Continued)

(51) Int. Cl.
*H04N 21/00* (2011.01)
*H04N 21/20* (2011.01)
(Continued)

(52) U.S. Cl.
CPC ... *H04N 21/4335* (2013.01); *H04N 21/44226* (2020.08); *H04N 21/4532* (2013.01); *H04N 21/454* (2013.01); *H04N 21/4756* (2013.01)

(58) Field of Classification Search
CPC ........ H04N 21/00; H04N 21/40; H04N 21/20; H04N 21/80; H04N 21/60; H04N 21/4335;
(Continued)

(56) References Cited

U.S. PATENT DOCUMENTS 6,239,794 B1    5/2001    Yuen et al.
6,388,714 B1    5/2002    Schein et al.
(Continued)

FOREIGN PATENT DOCUMENTS

EP    1231786 A2    8/2002

OTHER PUBLICATIONS

International Preliminary Report of Patentability of PCT/US2016/068670 dated Jul. 2, 2019.
(Continued)

*Primary Examiner* — Daquan Zhao
(74) *Attorney, Agent, or Firm* — Haley Guiliano LLP

(57) ABSTRACT

Systems and methods are disclosed herein for classifying, based on most recent information associated with recorded content, the recorded content to an appropriate deletion classifier. A media guidance application may receive information about an event that is associated with a recorded media asset. The media guidance application may determine, based on the event and a current deletion classifier associated with the recorded media asset, whether the current deletion classifier associated with the recorded media asset needs to be updated to a new deletion classifier. The media guidance application may make this determination by accessing a deletion classification database containing rules for classifying recorded media assets into a variety of deletion classifiers. Upon determining that the current deletion classifier associated with the recorded media asset needs to be updated to a new deletion classifier, the media guidance application may update the current deletion classifier to the new deletion classifier.

20 Claims, 9 Drawing Sheets

Related U.S. Application Data continuation of application No. 16/928,179, filed on Jul. 14, 2020, now Pat. No. 11,206,445, which is a continuation of application No. 16/471,086, filed as application No. PCT/US2016/068670 on Dec. 27, 2016, now Pat. No. 10,757,470.

(51) Int. Cl.

| | | |
|---|---|---|
| *H04N 21/40* | (2011.01) | |
| *H04N 21/4335* | (2011.01) | |
| *H04N 21/442* | (2011.01) | |
| *H04N 21/45* | (2011.01) | |
| *H04N 21/454* | (2011.01) | |
| *H04N 21/475* | (2011.01) | |
| *G06F 16/00* | (2019.01) | |
| *G06F 16/10* | (2019.01) | |
| *G06F 16/40* | (2019.01) | |

(58) Field of Classification Search
CPC ......... H04N 21/44226; H04N 21/4532; H04N 21/454; H04N 21/4756; G06F 16/125; G06F 16/162; G06F 16/40; G06F 16/00; G06F 16/10; G06F 16/20
USPC .................. 386/294, 292, 291, 278, 282
See application file for complete search history.

(56) References Cited

U.S. PATENT DOCUMENTS

| | | |
|---|---|---|
| 6,564,378 B1 | 5/2003 | Satterfield et al. |
| 6,756,997 B1 | 6/2004 | Ward et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 8,909,658 B2 | 12/2014 | Lee et al. |
| 10,037,468 B2 | 7/2018 | Yaguchi |
| 10,158,908 B1 | 12/2018 | Ramani et al. |
| 10,757,470 B2 | 8/2020 | Panchaksharaiah et al. |
| 11,206,445 B2 | 12/2021 | Panchaksharaiah et al. |
| 11,540,006 B2 | 12/2022 | Panchaksharaiah et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2006/0092282 A1* | 5/2006 | Herley ............ H04N 21/23406 348/E7.071 |
| 2006/0206819 A1* | 9/2006 | Tsuji ................... G11B 27/031 |
| 2007/0071399 A1 | 3/2007 | Ellis |
| 2010/0153885 A1 | 6/2010 | Yates |
| 2015/0003814 A1 | 1/2015 | Miller |
| 2019/0327516 A1 | 10/2019 | Panchaksharaiah et al. |
| 2020/0413126 A1 | 12/2020 | Panchaksharaiah et al. |
| 2022/0150574 A1 | 5/2022 | Panchaksharaiah et al. |

OTHER PUBLICATIONS

International Search Report and Written Opinion of PCT/US2016/068670 dated Sep. 22, 2017.

* cited by examiner

RECORDING PROPERTIES DATA STRUCTURE 100

| MEDIA ASSET IDENTIFIER | MEDIA ASSET TITLE | DELETION CLASSIFIER | |
|---|---|---|---|
| AX001 | FINDING NEMO | O.K. TO DELETE | } 110 |
| AX002 | ZOOTOPIA | O.K. TO DELETE | } 112 |
| AX003 | BEAUTY AND THE BEAST | RECOMMENDED TO DELETE | } 114 |
| AX004 | BOX TROLLS | O.K. TO DELETE | } 116 |
| AX005 | THE AVENGERS | RECOMMENDED TO DELETE | } 118 |
| AX006 | NATIONAL TREASURE | RECOMMENDED TO DELETE | } 120 |
| AX007 | THE HOBBIT | DO NOT DELETE | } 122 |
| AX008 | LORD OF THE RINGS | DO NOT DELETE | } 124 |

FIG. 1A

DELETION CLASSIFICATION DATABASE 150

| TRIGGER EVENT | ADDITIONAL INFORMATION | INITIAL DELETION CLASSIFIER | FINAL DELETION CLASSIFIER | INSTRUCTION | PRIORITY | |
|---|---|---|---|---|---|---|
| USER HAS CONSUMED A PORTION OF RECORDED MEDIA ASSET THAT IS NOT AN ENTIRETY OF THE RECORDED MEDIA ASSET | NONE | O.K. TO DELETE | DO NOT DELETE | IF (FIRST EVENT == TRIGGER EVENT VALUE) && (DELETION CLASSIFIER == INITIAL DELETION CLASSIFIER) {DELETION CLASSIFIER == FINAL DELETION CLASSIFIER} | 5 | } 164 |
| USER HAS CONSUMED A PORTION OF RECORDED MEDIA ASSET THAT IS NOT AN ENTIRETY OF THE RECORDED MEDIA ASSET | NONE | RECOMMENDED TO DELETE | DO NOT DELETE | IF (FIRST EVENT == TRIGGER EVENT VALUE) && (DELETION CLASSIFIER == INITIAL DELETION CLASSIFIER) {DELETION CLASSIFIER == FINAL DELETION CLASSIFIER} | 5 | } 166 |
| A VERSION OF RECORDED MEDIA ASSET IS FREELY AVAILABLE THROUGH A MEDIA CONSUMPTION PLATFORM | NONE | DO NOT DELETE | O.K. TO DELETE | IF (FIRST EVENT == TRIGGER EVENT VALUE) && (DELETION CLASSIFIER == INITIAL DELETION CLASSIFIER) {DELETION CLASSIFIER == FINAL DELETION CLASSIFIER} | 5 | } 168 |
| USER HAS CONSUMED A PORTION OF RECORDED MEDIA ASSET THAT IS NOT AN ENTIRETY OF THE RECORDED MEDIA ASSET | USER IS NOT INTERESTED IN THE RECORDED MEDIA ASSET | O.K. TO DELETE | RECOMMENDED TO DELETE | IF (FIRST EVENT == TRIGGER EVENT VALUE) && (DELETION CLASSIFIER == INITIAL DELETION CLASSIFIER) && (CRITERION DEFINED BY ADDITIONAL INFORMATION FULFILLED == TRUE) {DELETION CLASSIFIER == FINAL DELETION CLASSIFIER} | 10 | } 170 |

FIG. 1B

RECORDING PROPERTIES DATA STRUCTURE 100

| MEDIA ASSET IDENTIFIER | MEDIA ASSET TITLE | DELETION CLASSIFIER | |
|---|---|---|---|
| AX001 | FINDING NEMO | DO NOT DELETE | } 110 |
| AX002 | ZOOTOPIA | O.K. TO DELETE | } 112 |
| AX003 | BEAUTY AND THE BEAST | RECOMMENDED TO DELETE | } 114 |
| AX004 | BOX TROLLS | O.K. TO DELETE | } 116 |
| AX005 | THE AVENGERS | RECOMMENDED TO DELETE | } 118 |
| AX006 | NATIONAL TREASURE | RECOMMENDED TO DELETE | } 120 |
| AX007 | THE HOBBIT | DO NOT DELETE | } 122 |
| AX008 | LORD OF THE RINGS | DO NOT DELETE | } 124 |

Recorded Media Assets

Do Not Delete — 202

- 204 — Finding Nemo
- 206 — The Hobbit
- 208 — Lord of the Rings

210 — You Watched a Portion that is Not an Entirety of Finding Nemo.

- 212 — ○ Move to "Recommended to Delete"
- 214 — ○ Move to "O.K. to Delete"
- 216 — ○ Delete O.K. to Delete — 218

- 220 — Zootopia
- 222 — Boxtrolls

Recommended to Delete — 224

- 226 — Beauty and the Beast
- 228 — The Avengers
- 230 — National Treasure

FIG. 2

SYSTEM AND METHOD FOR CLASSIFYING RECORDED CONTENT FOR DELETION

CROSS-REFERENCE TO RELATED APPLICATIONS

This application is a continuation application of U.S. patent application Ser. No. 17/525,323, filed Nov. 12, 2021, which is a continuation application of U.S. patent application Ser. No. 16/928,179, filed Jul. 14, 2020, now U.S. Pat. No. 11,206,445, which is a continuation application of U.S. patent application Ser. No. 16/471,086, filed Jun. 19, 2019, now U.S. Pat. No. 10,757,470, which is a national stage application under 35 U.S.C. § 371 of International Application PCT/US2016/068670, filed Dec. 27, 2016. The disclosures of which are hereby incorporated by reference herein in their entireties.

BACKGROUND

Given the plethora of content available for consumption, it is not always possible for users to consume a piece of content right when it is made available. In such cases, a user may record content for later consumption. However, recording devices have finite storage capacity and recorded content have to be periodically deleted from recording devices to ensure that there is storage capacity available for recording new content. Because a recording device may contain a large amount of recorded content, it is very cumbersome for a user to manually determine which recorded content should be deleted. Current systems may recommend recorded content for deletion based on a variety of factors (e.g., genre of a recording, number of playbacks, duration for which recorded content was stored on the recording device). However, current systems do not use a variety of independent rules for moving recorded content bi-directionally between multiple deletion recommendation categories. Consequently, current systems are limited to providing coarse granularity deletion recommendations that are not updated based on new information.

SUMMARY

Therefore, systems and methods are disclosed herein for classifying, based on most recent information associated with recorded content, the recorded content to an appropriate deletion classifier. A media guidance application may receive information about an event that is associated with a recorded media asset. The media guidance application may determine, based on the event and a current deletion classifier associated with the recorded media asset, whether the current deletion classifier associated with the recorded media asset needs to be updated to a new deletion classifier. The media guidance application may make this determination by accessing a deletion classification database containing rules for classifying recorded media assets into a variety of deletion classifiers. Upon determining that the current deletion classifier associated with the recorded media asset needs to be updated to a new deletion classifier, the media guidance application may update the current deletion classifier associated with the recorded media asset to the new deletion classifier.

In some aspects, a media guidance application may be configured to update, in response to detecting a pre-defined trigger event, a deletion classifier associated with a recorded media asset from a current deletion classifier to a new deletion classifier. As referred to herein, the term "deletion classifier" refers to a descriptor that indicates a particular deletion-related characteristic. Deletion classifier includes, but is not limited to, "Do Not Delete," "O.K. to Delete," "Recommended to Delete," "Automatically Delete," "Store a Back-up Copy on a Different Device and Delete." and other similar classifiers. "Do Not Delete" deletion classifier may be used to indicate, to a user and the media guidance application, that a recorded media asset should not be deleted. As an illustrative example. "Do Not Delete" deletion classifier may be used for a recently recorded media asset that the user has not yet consumed. There may be an instruction associated with the "Do Not Delete" deletion classifier that instructs the media guidance application to refrain from deleting a recorded media asset corresponding to the "Do Not Delete" deletion classifier. As an illustrative example, the instruction may be a conditional programming statement for setting a "Delete" flag associated with a recorded media asset to "false" upon determining that the deletion classifier associated with the recorded media asset is "Do Not Delete."

"O.K. to Delete" deletion classifier may be used to indicate that neither deleting a recorded media asset nor not deleting a recorded media asset will have a detrimental impact on user experience. "O.K. to Delete" deletion classifier may be used for a recorded media asset that does not occupy too much space (i.e., not deleting the recorded media asset will not significantly impact available storage capacity) and is also available for free via a media consumption platform associated with the user (i.e., deleting the recorded media asset will not impact the user's ability to consume a version of the media asset). As an illustrative example, the "O.K. to Delete" deletion classifier may be associated with an instruction that includes an if-else conditional statement. The media guidance application may, based on the instruction associated with the "O.K. to Delete" deletion classifier, refrain from deleting a recorded media asset corresponding to the "O.K. to Delete" deletion classifier upon detecting a set of criteria is true and, delete the recorded media asset corresponding to the "O.K. to Delete" deletion classifier upon detecting the set of criteria is false. For example, the media guidance application may set a "Delete" flag associated with a recorded media asset corresponding to the "O.K. to Delete" deletion classifier to "false" upon detecting available storage is not below a certain available storage threshold value. The media guidance application may set a "Delete" flag associated with a recorded media asset corresponding to the "O.K. to Delete" deletion classifier to "true" upon detecting available storage is below the certain available storage threshold value.

"Recommended to Delete" deletion classifier may be used to indicate to a user that it would be beneficial to delete a recorded media asset. "Recommended to Delete" deletion classifier may be used for a recorded media asset that has been stored on a storage for a time period that is longer than threshold time period (e.g., six months). As an illustrative example, the "Recommended to Delete" deletion classifier may be associated with an instruction for setting a "Delete" flag associated with a recorded media asset corresponding to the "Recommended to Delete" deletion classifier to "true" upon detecting a certain set of criteria is true. The criteria for setting "Delete" flag to "true" may be more stringent for the "Recommended to Delete" deletion classifier than the "O.K. to Delete" deletion classifier. As an illustrative example, instruction associated with "Recommended to Delete" deletion classifier may be a conditional statement that if available storage is less than fifty gigabytes, then "Delete" flag should be set to "true." Instruction associated with "O.K. to Delete" deletion classifier may be a conditional statement that if available storage is less than five gigabytes, then "Delete" flag should be set to "true."

"Automatically Delete" deletion classifier may be associated with an instruction that indicates that a recorded media asset should be deleted without requiring further input from a user. As an illustrative example, the instruction may be a conditional statement that if deletion classifier for a recorded media asset is "Automatically Delete," then a "Delete" flag associated with the recorded media asset should be set to "true." For example, when available storage capacity falls below a threshold value (e.g., ten percent of total storage capacity available), the media guidance application may update deletion classifier associated with a recorded media asset that the user has already consumed to "Automatically Delete." The media guidance application may then set "Delete" flag associated with the recorded media asset to "true" and subsequently, delete the recorded media asset. "Store a Back-up Copy on a Different Device and Delete" deletion classifier may be associated with an instruction for storing a copy of a recorded media asset on another storage device prior to deleting the recorded media asset. "Store a Back-up Copy on a Different Device and Delete" deletion classifier may be used for a recently recorded media asset that the user has not consumed and that is consuming a lot of memory on the current storage device. For example, the media guidance application may store a back-up copy of a recorded media asset on a remote file hosting service associated with the user and then delete the recorded media asset from the DVR to free up more space for upcoming scheduled recordings. It should be noted that any systems and methods described here may be performed outside of a media guidance application.

The media guidance application may receive a first data packet containing information about a first event corresponding to a recorded media asset. As an illustrative example, a recorded media asset may be "Finding Nemo," a computer-animated comedy-drama adventure film. The media guidance application may receive a data packet containing information that a user has watched a portion but not an entirety of "Finding Nemo" (e.g., ten minutes of playback time). The media guidance application may access a recorded media asset properties data structure (e.g., recording properties data structure) to retrieve a first deletion classifier associated with the recorded media asset. For example, the media guidance application may retrieve an "O.K. to Delete" deletion classifier associated with "Finding Nemo."

The media guidance application may store, in a deletion classification database, a plurality of rule entries for classifying recorded media assets into a plurality of deletion classifiers, where each rule entry of the plurality of rule entries includes a trigger event field, an initial deletion classifier field and a final deletion classifier field, and each rule entry includes an instruction, for a given recorded media asset associated with a value corresponding to the initial deletion classifier field, for updating a deletion classifier associated with the given recorded media asset from the value corresponding to the initial deletion classifier field to a value corresponding to the final deletion classifier field in response to detecting an event corresponding to a value of the trigger event field.

As an illustrative example, the media guidance application may store two rules in a deletion classification database, rule A and rule B. For rule A, the values of the trigger event field, the initial deletion classifier field and the final deletion classifier field may be "a user has consumed a portion of recorded media asset that is not an entirety of the recorded media asset," "O.K. to Delete" and "Do Not Delete" respectively. Rule A may include an instruction for updating a deletion classifier associated with a given recorded media asset from "O.K. to Delete" to "Do Not Delete," in response to detecting that a user has consumed a portion, but not an entirety, of the given recorded media asset. For rule B, the values of the trigger event field, the initial deletion classifier field and the final deletion classifier field may be "a user has consumed a portion of recorded media asset that is not an entirety of the recorded media asset," "Recommended to Delete" and "Do Not Delete" respectively. Rule B may include an instruction for updating a deletion classifier associated with a given recorded media asset from "Recommended to Delete" to "Do Not Delete," in response to detecting that a user has consumed a portion, but not an entirety, of the given recorded media asset.

The media guidance application may query the deletion classification database for a first rule entry, where a value corresponding to a trigger event field associated with the first rule entry matches the first event and a value corresponding to a initial deletion classifier field associated with the first rule entry matches the first deletion classifier. For example, the media guidance application may query (e.g., by using database management languages such as SQL, JAPQL, CODASYL or another suitable language) the deletion classification database for a rule entry that has a trigger event field value of "a user has consumed a portion of recorded media asset that is not an entirety of the recorded media asset" and initial deletion classifier field value of "O.K. to Delete." The media guidance application may retrieve, based on the querying, the first rule entry that is associated with both the first event and the first deletion classifier. For example, the media guidance application may retrieve rule A that is associated with both trigger event field value of "a user has consumed a portion of recorded media asset that is not an entirety of the recorded media asset" and initial deletion classifier field value of "O.K. to Delete."

The media guidance application may retrieve a value corresponding to a final deletion classifier field associated with the first rule entry, where the value corresponding to the final deletion classifier field associated with the first rule entry is a second deletion classifier. For example, the media guidance application may retrieve "Do Not Delete" corresponding to the final deletion classifier field associated with rule A. The media guidance application may update the recorded media asset properties data structure by substituting the first deletion classifier associated with the recorded media asset with the second deletion classifier. For example, the media guidance application may update the recording properties data structure by substituting "O.K. to Delete" deletion classifier associated with "Finding Nemo" with "Do Not Delete" deletion classifier.

The media guidance application may use deletion classifiers to group recorded media asset identifiers in a display so that a user can easily identify a deletion classifiers associated with a given recorded media assets. For example, the media guidance application generate for display identifiers corresponding to recorded media assets associated with "Do Not Delete" delete classifier with one type of indicator (e.g., a red dot alongside the indicator) and identifiers corresponding to recorded media assets associated with "O.K. to Delete" delete classifier with another type of indicator (e.g., a yellow dot alongside the indicator). The media guidance application may, when generating for display an indicator associated with a given recorded media asset, retrieve deletion classifier associated with the given recorded media asset in order to determine type of indicator. In some embodiments, the media guidance application may receive a user request to view only recorded media assets associated with a specific deletion classifier (e.g., "Recommended to Delete"). The media guidance application may query the recordings properties data structure for recorded media assets that are associated with the specific deletion classifier and generate for display identifiers for recorded media assets returned by the query. In some embodiments, the media guidance application may automatically delete recorded media assets that are associated with a specific deletion classifier (e.g., "Automatically Delete"). The media guidance application may query the recordings properties for recorded media assets that are associated with the specific deletion classifier and automatically delete recorded media assets returned by the query.

In some embodiments, the media guidance application may, upon detecting a pre-defined trigger event, change current deletion classifier associated with a recorded media asset back to a deletion classifier that was previously associated with the recorded media asset. Specifically, the media guidance application may receive a second data packet containing information about a second event corresponding to the recorded media asset. For example, the media guidance application may receive a data packet containing information that "Finding Nemo" is freely available through a media consumption platform associated with the user (e.g., "Finding Nemo" is available for free on the user's Netflix account). The media guidance application may access the recorded media asset properties data structure to retrieve the second deletion classifier associated with the recorded media asset. For example, the media guidance application may retrieve a "Do Not Delete" deletion classifier associated with "Finding Nemo" from the recording properties data structure.

The media guidance application may retrieve, from the deletion classification database, a second rule entry that is associated with both the second event and the second deletion classifier. For example, the media guidance application may retrieve, from the deletion classification, rule C that has a trigger event field value of "a version of recorded media asset is freely available through a media consumption platform associated with the user," and initial deletion classifier field value of "Do Not Delete." Rule C may also include a final deletion classifier field value of "O.K. to Delete" and an instruction for updating a deletion classifier associated with a given recorded media asset from "Do Not Delete" to "O.K. to Delete," in response to detecting that a version of recorded media asset is freely available through a media consumption platform associated with the user. The media guidance application may update the recorded media asset properties data structure by substituting the second deletion classifier associated with the recorded media asset with a value corresponding to a final deletion classifier field associated with the second rule entry, where the value corresponding to the final deletion classifier field associated with the second rule entry is the first deletion classifier. For example, the media guidance application may update the recording properties data structure by substituting "Do Not Delete" deletion classifier associated with "Finding Nemo" with "O.K. to Delete" deletion classifier.

In some embodiments, the media guidance application may be configured to update a deletion classifier associated with a recorded media asset from a current deletion classifier to a new deletion classifier based on at least two factors: detecting a pre-defined trigger event and determining some pre-defined criterion has been fulfilled. In some embodiments, a rule entry of the plurality of rule entries may include an additional information field. The rule entry may also include an instruction for updating the deletion classifier associated with the given recorded media asset that includes an instruction for updating the deletion classifier associated with the given recorded media asset in response to detecting both an event corresponding to a value of trigger event field associated with the rule entry and determining that a criterion defined by a value of the additional information field is fulfilled.

As an illustrative example, the deletion classification database may include rule D which has a trigger event field value of "user has consumed a portion of recorded media asset that is not an entirety of the recorded media asset," additional information field value of "user is not interested in the recorded media asset," an initial deletion classifier field value of "O.K. to Delete" and a final deletion classifier field value of "Recommended to Delete." Rule D may include an instruction for updating deletion classifier associated with a given recorded media asset from "O.K. to Delete" to "Recommended to Delete," in response to both detecting that a user has consumed a portion of recorded media asset that is not an entirety of the recorded media asset and determining that the user is not interested in the recorded media asset. For the case where current deletion classifier associated with "Finding Nemo" is "O.K. to Delete," the media guidance application may, upon detecting that a user has watched ten minutes of "Finding Nemo," access a data structure (e.g., a user profile data structure) to determine whether the user is interested in "Finding Nemo." As an illustrative example, in response to determining that the user is interested in "Finding Nemo" (e.g., retrieving a "true" value for an "interested in media asset" field associated with "Finding Nemo"), the media guidance application may determine that the criterion defined by value of the additional information field is not fulfilled. Accordingly, the media guidance application may refrain from updating the deletion classifier associated with "Finding Nemo." As another illustrative example, in response to determining that the user is not interested in "Finding Nemo" (e.g., retrieving a "false" value for an "interested in media asset" field associated with "Finding Nemo"), the media guidance application may determine that the criterion defined by value of the additional information field is fulfilled. Accordingly, the media guidance application may update the deletion classifier associated with "Finding Nemo" from "O.K. to Delete" to "Recommended to Delete."

The media guidance application may store, in the deletion classification database, rule entries that correspond to different combinations of trigger event field values and additional information field values. A value that is associated with the trigger event field for one rule may be associated with the additional information field for another rule and vice versa. Value of the trigger event field and/or value of the additional information field may include, but is not limited to: a version of the given recorded media asset becoming available for free through a media consumption platform (e.g., "Finding Nemo" becoming available for free on Netflix); a version of the given recorded media asset being scheduled for broadcast within some pre-defined time period (e.g., "Finding Nemo" being scheduled for broadcast on Television channel ABC Family within one week time window from a current time); a user consuming a portion of the given recorded media asset (e.g., user watched ten minutes of "Finding Nemo"): the user consuming a portion of a version of the given recorded media asset that is available from a different source (e.g., user watched ten minutes of "Finding Nemo" on Netflix); media asset associated with the given recorded media asset being scheduled to be available within some pre-defined time period (e.g., "Finding Dory," a sequel film to "Finding Nemo," being scheduled for broadcast on Television channel ABC Family within one week time window from a current time); available memory of a storage device that the given recorded media asset is stored on falling below a pre-defined threshold available memory value (e.g., available storage capacity of DVR that "Finding Nemo" is stored on falling below ten percent of total storage capacity of the DVR); duration of time for which the given recorded media asset was stored on the storage device exceeding a pre-defined threshold storage time duration value (e.g., "Finding Nemo" being stored for more than three months), a level of interest of the user in the given recorded media asset (e.g., user having a interest score of eight in "Finding Nemo," where interest score is defined on a scale of one to ten with a higher score corresponding to a greater level of interest); a number of users who have consumed the given recorded media asset (e.g., three registered users have consumed "Finding Nemo"); an identity of the user who has consumed the given recorded media asset (e.g., Toddler Tom has consumed "Finding Nemo"). In some embodiments, a rule entry may include multiple additional information fields. In such instances, the media guidance application may update a deletion classifier associated with a given recorded given media asset upon determining that all criteria defined by values corresponding to the multiple additional information fields have been fulfilled.

In some embodiments, rule entries in the deletion classification database may have priority values associated with them where a priority value associated with a given rule indicates an importance of the given rule on some pre-defined scale. In some embodiments, each rule entry of the plurality of rule entries may further include a priority field, where a value corresponding to a priority field associated with a given rule entry defines a priority level associated with the given rule entry. As an illustrative example, priority level may be defined on a scale of one to ten, with priority level of ten being most important. For example, rule A, with trigger event field value of "a user has consumed a portion of recorded media asset that is not an entirety of the recorded media asset." initial deletion classifier field value of "O.K. to Delete" and final deletion classifier field value of "Do Not Delete." may have priority field value of five. For example, rule D, with trigger event field value of "user has consumed a portion of recorded media asset that is not an entirety of the recorded media asset." additional information field value of "user is not interested in the recorded media asset," initial deletion classifier field value of "O.K. to Delete" and final deletion classifier field value of "Recommended to Delete," may have priority field value of ten. Thus, in this illustrative example, rule D is a more important than rule A.

In some embodiments, the deletion classification database may include multiple rule entries that are associated with the same trigger event and initial deletion classifier (e.g., rule entries that have same trigger event and initial deletion classifier but different additional information field values). In such cases, the media guidance application may select the most important rule entry among the multiple rule entries for updating deletion classifier. In some embodiments, querying the deletion classification database for the first rule entry may return multiple rule entries. For example, the media guidance application may query for rule entries that are associated with trigger event field value of "a user has consumed a portion of recorded media asset that is not an entirety of the recorded media asset" and initial deletion classifier field value of "O.K. to Delete." The query result may include unique identifiers corresponding to rule A and rule D.

The media guidance application may, when determining the first rule entry, determine, based on comparing values corresponding to priority field associated with each rule entry of the multiple rule entries, a rule entry of the multiple rule entries that is associated with the highest priority level. For example, the media guidance application may compare priority field value associated with rule A (e.g., five) with priority field value associated with rule D (e.g., ten). The media guidance application may select the rule entry of the multiple rule entries that is associated with the highest priority level as the first rule entry. In this example, the media guidance application may select rule D as the first rule entry.

In some embodiments, the media guidance application may determine that, in order to apply the most important rule entry associated with a trigger event and an initial deletion classifier, criterion associated with the most important rule entry has to be fulfilled. The media guidance application may, upon determining that the criterion associated with the most important rule entry is not fulfilled, select the second most important rule entry that is also associated with the trigger event and the initial deletion classifier. In some embodiments, the rule entry of the multiple rule entries that is associated with the highest priority level may further include an additional information field. For example, rule D may include an additional information field. The media guidance application may retrieve a value associated with the additional information field. For example, the media guidance application may retrieve value of "user is not interested in the recorded media asset" corresponding to additional information field associated with rule D.

The media guidance application may determine, based on the value associated with the additional information field, relevant information required for determining whether a criterion defined by the value of the additional information field is fulfilled. For example, the media guidance application may determine, based on "user is not interested in the recorded media asset," that information that defines the user's interest in "Finding Nemo" is necessary to determine whether the user is interested in "Finding Nemo." The media guidance application may access a data structure containing the relevant information to retrieve the relevant information. For example, the media guidance application may access a user profile data structure, associated with the user, to retrieve a value corresponding to an "interested in media asset" field corresponding to "Finding Nemo." As an illustrative example, the media guidance application may retrieve a "null" value which indicates that there is no information that defines the user's interest in "Finding Nemo."

The media guidance application may compare the value associated with the additional information field with the relevant information to determine whether the criterion defined by the value of the additional information field is fulfilled. For example, the media guidance application may compare the "null" value with "user is not interested in the recorded media asset" using an appropriate logic program script to determine whether "null" value corresponds to a user not being interested in a recorded media asset. The media guidance application may, in response to determining that the criterion defined by the value of the additional information field is not fulfilled, select rule entry of the multiple rule entries that is associated with next highest priority level as the first rule entry instead. For example, the media guidance application may determine that a "null" value provides no information defining the user's interest in "Finding Nemo" and accordingly, does not correspond to the user not being interested in "Finding Nemo." In this case, the media guidance application may select rule A, which is associated with priority field value of five, as the first rule entry instead.

In some embodiments, the media guidance application may provide a user information regarding why a give recorded media asset identifier was classified into a specific deletion classifier. In some embodiments, the media guidance application may generate for simultaneous display an identifier corresponding to the recorded media asset, deletion classifier associated with the recorded media asset and a reason for classifying the recorded media asset into the deletion classifier associated with the recorded media asset. For example, subsequent to updating a deletion classifier associated with "Finding Nemo" from "O.K. to Delete" to "Do Not Delete," in response to detecting that a user has watched ten minutes of "Finding Nemo," the media guidance application may generate for simultaneous display an identifier for "Finding Nemo," "Do Not Delete" classifier and a notification "You watched a portion that is not an entirety of Finding Nemo."

In some embodiments, the media guidance application may provide a user an option to change a deletion classifier associated with a recorded media asset. Specifically, the media guidance application may generate for display a plurality of selectable deletion classifier options corresponding to the recorded media asset, where each selectable deletion classifier option of the plurality of selectable deletion classifier options corresponds to a deletion classifier of the plurality of deletion classifiers. As a matter of example. "Finding Nemo" may be associated with "Do Not Delete" deletion classifier. The media guidance application may generate for display, for "Finding Nemo," selectable option "Move to 'O.K. to Delete'" corresponding to "O.K. to Delete" deletion classifier and selectable option "Move to 'Recommended to Delete'" corresponding to "Recommended to Delete" deletion classifier. The media guidance application may receive a user selection of a selectable deletion classifier option of the plurality of selectable deletion classifier options. For example, the media guidance application may receive a selection of selectable option "Move to 'Recommended to Delete'" corresponding to "Finding Nemo."

The media guidance application may access a data structure that contains information about mapping between the plurality of selectable deletion classifier options and the plurality of deletion classifiers to determine a deletion classifier corresponding to the selected selectable deletion classifier option. For example, the media guidance application may access a look-up table that defines relationship between selectable deletion classifier options and the plurality of deletion classifiers to determine which deletion classifier selectable option "Move to 'Recommended to Delete'" corresponds to. The media guidance application may retrieve the deletion classifier corresponding to the selected selectable deletion classifier option. For example, the media guidance application may retrieve "Recommended to Delete" deletion classifier that corresponds to the selected option "Move to 'Recommended to Delete'." The media guidance application may update the recorded media asset properties data structure by substituting the second deletion classifier associated with the deletion classifier corresponding to the selected selectable deletion classifier option. For example, the media guidance application may update the recording properties data structure by substituting "Do Not Delete" deletion classifier associated with "Finding Nemo" with "Recommended to Delete."

In some embodiments, the media guidance application may automatically delete recorded media assets associated with a specific deletion classifier after some predefined period of time has elapsed. Specifically, the media guidance application may select recorded media assets associated with a third deletion classifier of the plurality of deletion classifiers for automatic deletion after a pre-defined period of time has elapsed. For example, the media guidance application may select all recorded media assets (e.g., Beauty and the Beast, The Avengers and National Treasure) associated with the "Recommended to Delete" deletion classifier for automatic deletion after seventy two hours from a current time (e.g., Dec. 4, 12:00 A.M.) has elapsed. The media guidance application may store in memory a "deletion time" variable that corresponds to a date and time when the recorded media assets selected for automatic deletion should be automatically deleted. Following from the example above, the media guidance application may store a value that is a sum of seventy two hours and the current time (i.e., Dec. 7, 12:00 A.M.) in the "deletion time" variable.

The media guidance application may generate for display a recommendation to consume the recorded media assets associated with the third deletion classifier before the pre-defined period of time has elapsed. For example, the media guidance application may generate for display a notification such as "the listed media assets will be deleted on Dec. 7, 12:00 A.M. Watch the media assets before they are deleted." The media guidance application may receive a data packet containing information that the pre-defined period of time has elapsed. For example, the media guidance application may receive a data packet containing a date and time stamp of a current date and time (e.g., Dec. 7, 12:00 A.M). The media guidance application may determine, based on comparing the date and time stamp of the current date and value of the "deletion time" variable, that seventy-two hours from Dec. 4, 12:00 A.M, has elapsed. The media guidance application may, in response to receiving the data packet containing information that the pre-defined period of time has elapsed, automatically delete the recorded media assets associated with the third deletion classifier. For example, the media guidance application may automatically delete recorded media assets Beauty and the Beast, The Avengers and National Treasure upon receiving data packet containing current date and time stamp of Dec. 7, 12:00 A.M.

It should be noted that the systems, methods, apparatuses, and/or aspects described above may be applied to, or used in accordance with, other systems, methods, apparatuses, and/or aspects described in this disclosure. It should also be noted, the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 1A-IC depict an illustrative recorded media asset properties data structure that the media guidance application may access and update, and an illustrative deletion classification database that the media guidance application may access when classifying recorded content for deletion, in accordance with some embodiments of the disclosure;

FIG. 2 depicts an illustrative display that the media guidance application may generate for display for providing information regarding why a give recorded media asset identifier was classified into a specific deletion classifier, in accordance with some embodiments of the disclosure;

DETAILED DESCRIPTION

Figure 3:
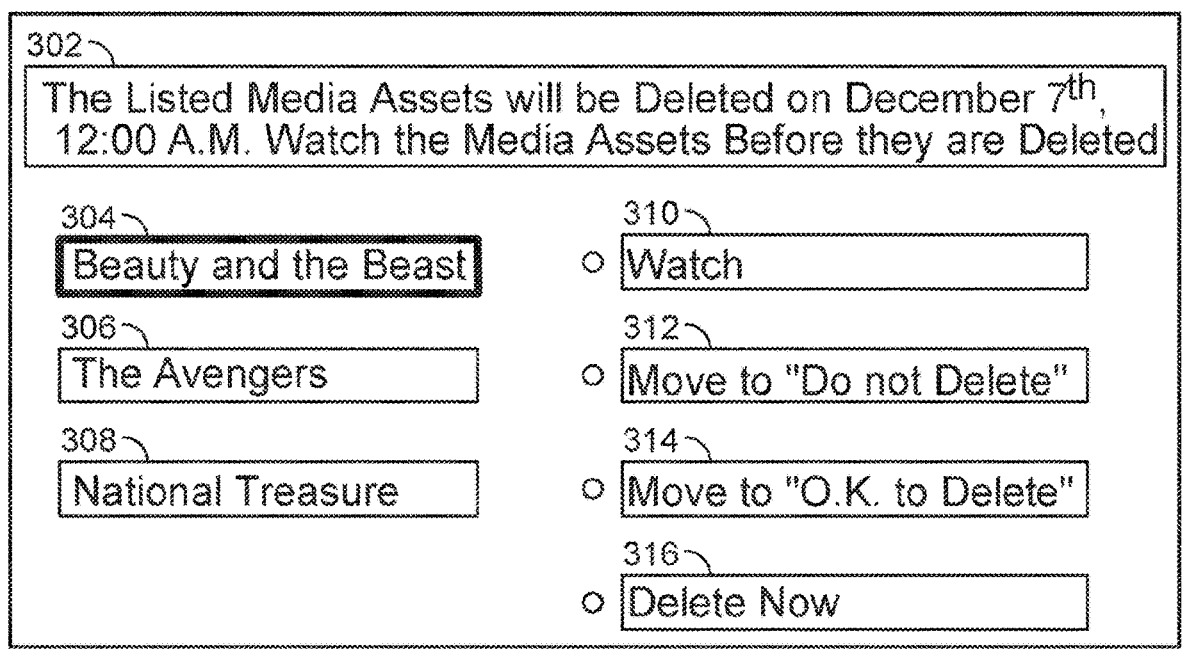
FIG. 3 depicts an illustrative display that the media guidance application may generate for display for informing a user that certain recorded media assets will be automatically deleted, in accordance with some embodiments of the disclosure.

The described systems and methods classify, based on most recent information associated with recorded content, the recorded content to an appropriate deletion classifier. A media guidance application may receive information about an event that is associated with a recorded media asset. The media guidance application may determine, based on the event and a current deletion classifier associated with the recorded media asset, whether the current deletion classifier associated with the recorded media asset needs to be updated to a new deletion classifier. The media guidance application may make this determination by accessing a deletion classification database containing rules for classifying recorded media assets into a variety of deletion classifiers. Upon determining that the current deletion classifier associated with the recorded media asset needs to be updated to a new deletion classifier, the media guidance application may update the current deletion classifier associated with the recorded media asset to the new deletion classifier.

The media guidance application may reside on user television equipment 702, user computer equipment 704, and/or wireless user communications device 706. In some embodiments, some or all portions of the media guidance application may be located at media content source 716 and/or media guidance data source 718. In some embodiments, portions of the media guidance application may be located on each of user television equipment 702, user computer equipment 704, wireless user communications device 706, media content source 716 and media guidance data source 718.

In some aspects, a media guidance application may be configured to update, in response to detecting a pre-defined trigger event, a deletion classifier associated with a recorded media asset from a current deletion classifier to a new deletion classifier. Deletion classifier includes, but is not limited to, "Do Not Delete," "O.K. to Delete," "Recommended to Delete," "Automatically Delete." "Store a Backup Copy on a Different Device and Delete," and other similar classifiers. The media guidance application may update a deletion classifier associated with a recorded media asset based on a rule included in a deletion classification database. A rule included in the deletion classification database may include an instruction for updating, in response to detecting a pre-defined trigger event, a deletion classifier associated with a recorded media asset from a current deletion classifier to a new deletion classifier.

FIGS. 1A-IC depict an illustrative recorded media asset properties data structure that the media guidance application may access and update, and an illustrative deletion classification database that the media guidance application may access when classifying recorded content for deletion, in accordance with some embodiments of the disclosure. The depicted data structures are only illustrative embodiments. Information about recorded media assets and rules for classifying recorded media assets into deletion classifiers may be stored and categorized using other suitable data storage structures (e.g., linked lists, arrays) without departing from the scope of this invention.

Data structure 100 may contain information about recorded media assets. As an illustrative example, data structure 100 may include entries 110, 112, 114, 116, 118, 120, 122 and 124. Each entry in data structure 100 may include several fields that provide descriptive information about a recorded media asset associated with the entry. Exemplary fields include, but are not limited to, media asset identifier 104, media asset title 106, and deletion classifier 108. Media asset identifier 104 may be a unique or specific identifier associated with a recorded media asset or a pointer or link to the recorded media asset itself. In some embodiments, in order to populate the different fields of an entry associated with a recorded media asset, the media guidance application may retrieve relevant information associated with the recorded media asset from metadata, located at any of storage 608, media content source 716 and media guidance data source 718, associated with the recorded media asset.

Database 150 may store a plurality of rules for classifying recorded media assets into deletion classifiers. As an illustrative example, database 150 may include rule entries 164, 166, 168, and 170. Each rule entry in database 150 may include several fields that are used to define the rule. Exemplary fields include, but are not limited to, trigger event 152, additional information 154, initial deletion classifier 156, final deletion classifier 158, instruction 160 and priority 162. Trigger event 152 may define some event associated with a recorded media asset that initiates a change in deletion classifier associated with the recorded media asset. Additional information 154 may define a criterion that has to be fulfilled for a rule to apply. Initial deletion classifier 156 may define a current deletion classifier that must be associated with a recorded media asset for a rule to apply. Final deletion classifier 158 may define a new deletion classifier that deletion classifier associated with a recorded media asset will be updated to upon application of the rule. Instruction 160 may provide information about how trigger event 152, additional information 154, initial deletion classifier 156, and final deletion classifier 158 may be used to update deletion classifier. Priority 162 may define a level of importance of rule entry on some pre-defined scale.

The media guidance application may receive a first data packet containing information about a first event corresponding to a recorded media asset. As an illustrative example, a recorded media asset may be "Finding Nemo," a computer-animated comedy-drama adventure film. The media guidance application may receive a data packet containing information that a user has watched a portion but not an entirety of "Finding Nemo" (e.g., ten minutes of playback time). The media guidance application may access a recorded media asset properties data structure (e.g., data structure 100 located at any of storage 608, media content source 716 and media guidance data source 718) to retrieve a first deletion classifier associated with the recorded media asset. As an illustrative example, entry 110 in data structure 100 may be associated with "Finding Nemo." The media guidance application may access entry 110 and retrieve a value corresponding to deletion classifier 108 (e.g., "O.K. to Delete").

The media guidance application may store, in a deletion classification database, a plurality of rule entries for classifying recorded media assets into a plurality of deletion classifiers, where each rule entry of the plurality of rule entries includes a trigger event field, an initial deletion classifier field and a final deletion classifier field, and each rule entry includes an instruction, for a given recorded media asset associated with a value corresponding to the initial deletion classifier field, for updating a deletion classifier associated with the given recorded media asset from the value corresponding to the initial deletion classifier field to a value corresponding to the final deletion classifier field in response to detecting an event corresponding to a value of the trigger event field.

As an illustrative example, the media guidance application may store rule entries 164, 166, 168 and 170 in database 150. For rule entry 164, the values of the trigger event 152, initial deletion classifier 156 and final deletion classifier 158 may be "a user has consumed a portion of recorded media asset that is not an entirety of the recorded media asset," "O.K. to Delete" and "Do Not Delete" respectively. Rule entry 164 may include a value corresponding instruction 160 that defines updating a deletion classifier associated with a given recorded media asset from "O.K. to Delete" to "Do Not Delete," in response to detecting that a user has consumed a portion, but not an entirety, of the given recorded media asset. For rule entry 166, the values of trigger event 152, initial deletion classifier 156 and final deletion classifier 158 may be "a user has consumed a portion of recorded media asset that is not an entirety of the recorded media asset," "Recommended to Delete" and "Do Not Delete" respectively. Rule entry 166 may include a value corresponding to instruction 160 that defines updating a deletion classifier associated with a given recorded media asset from "Recommended to Delete" to "Do Not Delete," in response to detecting that a user has consumed a portion, but not an entirety, of the given recorded media asset.

The media guidance application may query the deletion classification database for a first rule entry, where a value corresponding to a trigger event field associated with the first rule entry matches the first event and a value corresponding to a initial deletion classifier field associated with the first rule entry matches the first deletion classifier. For example, the media guidance application may query (e.g., by using database management languages such as SQL, JAPQL, CODASYL or another suitable language) database 150 for a rule entry that has a value corresponding to trigger event 152 of "a user has consumed a portion of recorded media asset that is not an entirety of the recorded media asset" and a value corresponding to initial deletion classifier 156 of "O.K. to Delete." As an illustrative example, the media guidance application may use SQL SELECT command (e.g., SELECT*FROM "database 150" WHERE ("trigger event 152 value"="a user has consumed a portion of recorded media asset that is not an entirety of the recorded media asset") AND ("initial deletion classifier 156"="O.K. to Delete")) to perform the query. The media guidance application may retrieve, based on the querying, the first rule entry that is associated with both the first event and the first deletion classifier. For example, the media guidance application may retrieve rule entry 164 that is associated with both trigger event field value of "a user has consumed a portion of recorded media asset that is not an entirety of the recorded media asset" and initial deletion classifier field value of "O.K. to Delete." The query result may return a unique identifier associated with rule entry 164, a pointer or link to rule entry 164 or rule entry 164 itself.

The media guidance application may retrieve a value corresponding to a final deletion classifier field associated with the first rule entry, where the value corresponding to the final deletion classifier field associated with the first rule entry is a second deletion classifier. For example, the media guidance application may retrieve "Do Not Delete" corresponding to final deletion classifier 158 associated with rule entry 164. The media guidance application may update the recorded media asset properties data structure by substituting the first deletion classifier associated with the recorded media asset with the second deletion classifier. For example, the media guidance application may update data structure 100 by substituting "O.K. to Delete" deletion classifier associated with "Finding Nemo" with "Do Not Delete" deletion classifier. FIG. 1C depicts updated data structure 100, where, for entry 110 corresponding to "Finding Nemo", value associated with deletion classifier 108 is "Do Not Delete" following the update.

The media guidance application may use deletion classifiers to group recorded media asset identifiers in a display so that a user can easily identify a deletion classifiers associated with a given recorded media assets. For example, the media guidance application generate for display identifiers corresponding to recorded media assets associated with "Do Not Delete" delete classifier with one type of indicator (e.g., a red dot alongside the recorded media assets) and identifiers corresponding to recorded media assets associated with "O.K. to Delete" delete classifier with another type of indicator (e.g., a yellow dot alongside the recorded media assets). The media guidance application may, when generating for display an indicator associated with a given recorded media asset, retrieve deletion classifier associated with the given recorded media asset in order to determine type of indicator. In some embodiments, the media guidance application may receive, via user input interface 610, a user request to view only recorded media assets associated with a specific deletion classifier (e.g., "Recommended to Delete"). The media guidance application may access data structure 100 to determine entries that that are associated with the specific deletion classifier. As an illustrative example, the media guidance application may retrieve entries 114, 118 and 120 that are associated with "Recommended to Delete" deletion classifier. The media guidance application may retrieve values corresponding to media asset identifier 104 and media asset title 106 for entries 114, 118 and 120 and based on the values, generate for display media asset identifiers for recorded media assets entries 114, 118 and 120. In some embodiments, the media guidance application may automatically delete recorded media assets that are associated with a specific deletion classifier (e.g., "Recommended to Delete"). The media guidance application may determine, based on values corresponding to media asset identifier 104, media asset identifiers corresponding to recorded media assets that are associated with the specific deletion classifier. The media guidance application may set a "Delete" flag associated with the determined media asset identifiers to "true" to select recorded media assets corresponding to the determined media asset identifiers for deletion.

In some embodiments, the media guidance application may automatically delete a portion but not an entirety of a recorded media asset. For example, the media guidance application may determine that a user has watched first ten minutes of "Finding Nemo," and delete the first ten minutes of "Finding Nemo." In order to selectively delete portions of a recorded media asset, the media guidance application may compare time code associated with a given frame of the recorded media asset with a threshold time code to determine whether the given frame should be deleted. Time code associated with a frame of the media asset may be in the format (hour: minute: second: frame) where (hour: minute: second) portion indicates an amount of time elapsed from start point of the media asset and (frame) identifies a frame associated with point in time indicated by the (hour: minute: second) portion. For example, for the case where the first ten minutes of "Finding Nemo" is to be deleted, the media guidance application may select frames that have a time code preceding (00:10:00:00) for deletion.

In some embodiments, the media guidance application may, upon detecting a pre-defined trigger event, change current deletion classifier associated with a recorded media asset back to a deletion classifier that was previously associated with the recorded media asset. Specifically, the media guidance application may receive a second data packet containing information about a second event corresponding to the recorded media asset. For example, the media guidance application may receive a data packet containing information that "Finding Nemo" is freely available through a media consumption platform associated with the user (e.g., "Finding Nemo" is available for free on the user's Netflix account). The media guidance application may access the recorded media asset properties data structure to retrieve the second deletion classifier associated with the recorded media asset. For example, the media guidance application may access entry 110 in updated data structure 100 (depicted in FIG. 1C) and retrieve value corresponding to deletion classifier 108 (e.g., "Do Not Delete").

The media guidance application may retrieve, from the deletion classification database, a second rule entry that is associated with both the second event and the second deletion classifier. For example, the media guidance application may retrieve (e.g., by using SQL SELECT command), from database 150, rule entry 166 that has a value of "a version of recorded media asset is freely available through a media consumption platform associated with the user" corresponding to trigger event 152 and "Do Not Delete" corresponding to initial deletion classifier 156. Rule entry 166 may also include a value of "O.K. to Delete" corresponding to final deletion classifier 158, and an instruction, corresponding to instruction 160, for updating a deletion classifier associated with a given recorded media asset from "Do Not Delete" to "O.K. to Delete," in response to detecting that a version of recorded media asset is freely available through a media consumption platform associated with the user. The media guidance application may update an entry in data structure 100 by substituting current value corresponding to deletion classifier 108 for the entry with value corresponding to final deletion classifier 158 associated with the second rule entry. For example, the media guidance application may update the data structure 100 by substituting "Do Not Delete" deletion classifier associated with entry 110 with "O.K. to Delete" deletion classifier.

In some embodiments, the media guidance application may be configured to update a deletion classifier associated with a recorded media asset from a current deletion classifier to a new deletion classifier based on at least two factors: detecting a pre-defined trigger event and determining some pre-defined criterion has been fulfilled. In some embodiments, a rule entry of the plurality of rule entries may include an additional information field. For example, database 150 may include a field additional information 154. The rule entry may also include an instruction for updating the deletion classifier associated with the given recorded media asset that includes an instruction for updating the deletion classifier associated with the given recorded media asset in response to detecting both an event corresponding to a value of trigger event field associated with the rule entry and determining that a criterion defined by a value of the additional information field is fulfilled.

As an illustrative example, database 150 may include rule entry 170 which has a value of "user has consumed a portion of recorded media asset that is not an entirety of the recorded media asset" corresponding to trigger event 152, value of "user is not interested in the recorded media asset" corresponding to additional information 154, a value of "O.K. to Delete" corresponding to initial deletion classifier 156 and a value of "Recommended to Delete" corresponding to final deletion classifier 158. In some embodiments, a value corresponding to additional information 154 may also include an instruction that defines how a criterion defined by the value corresponding to additional information 154 may be fulfilled. As an illustrative example, for the case where value corresponding to additional information 154 is "user is not interested in the recorded media asset." the value may also include a conditional programming statement that defines a "false" value for an "interested in media asset" field or a score quantifying a user's interest in a media asset being less than a threshold score value as indicators of a user not being interested in a media asset. Rule entry 170 may include an instruction, corresponding to instruction 160, for updating deletion classifier associated with a given recorded media asset from "O.K. to Delete" to "Recommended to Delete," in response to both detecting that a user has consumed a portion of recorded media asset that is not an entirety of the recorded media asset and determining that the user is not interested in the recorded media asset.

For the case where current deletion classifier associated with "Finding Nemo" is "O.K. to Delete," the media guidance application may, upon detecting that a user has watched ten minutes of "Finding Nemo," access a data structure (e.g., a user profile data structure) to determine whether the user is interested in "Finding Nemo." As an illustrative example, in response to determining that the user is interested in "Finding Nemo" (e.g., retrieving a "true" value for an "interested in media asset" field associated with "Finding Nemo"), the media guidance application may determine that the criterion defined by value of the additional information field is not fulfilled. Accordingly, the media guidance application may refrain from updating the deletion classifier associated with "Finding Nemo." As another illustrative example, in response to determining that the user is not interested in "Finding Nemo" (e.g., retrieving a "false" value for an "interested in media asset" field associated with "Finding Nemo"), the media guidance application may determine that the criterion defined by value of the additional information field is fulfilled. Accordingly, the media guidance application may update the deletion classifier associated with "Finding Nemo" from "O.K. to Delete" to "Recommended to Delete."

The media guidance application may store, database 150, rule entries that correspond to different combinations of trigger event field values and additional information field values. A value that is associated with the trigger event 152 for one rule entry may be associated with the additional information 154 for another rule and vice versa. Value of the trigger event field and/or value of the additional information field may include, but is not limited to: a version of the given recorded media asset becoming available for free through a media consumption platform (e.g., "Finding Nemo" becoming available for free on Netflix): a version of the given recorded media asset being scheduled for broadcast within some pre-defined time period (e.g., "Finding Nemo" being scheduled for broadcast on Television channel ABC Family within one week time window from a current time): a user consuming a portion of the given recorded media asset (e.g., user watched ten minutes of "Finding Nemo"); the user consuming a portion of a version of the given recorded media asset that is available from a different source (e.g., user watched ten minutes of "Finding Nemo" on Netflix); media asset associated with the given recorded media asset being scheduled to be available within some pre-defined time period (e.g., "Finding Dory." a sequel film to "Finding Nemo." being scheduled for broadcast on Television channel ABC Family within one week time window from a current time); available memory of a storage device that the given recorded media asset is stored on falling below a pre-defined threshold available memory value (e.g., available storage capacity of DVR that "Finding Nemo" is stored on falling below ten percent of total storage capacity of the DVR); duration of time for which the given recorded media asset was stored on the storage device exceeding a pre-defined threshold storage time duration value (e.g., "Finding Nemo" being stored for more than three months); a level of interest of the user in the given recorded media asset (e.g., user having a interest score of eight in "Finding Nemo," where interest score is defined on a scale of one to ten with a higher score corresponding to a greater level of interest): a number of users who have consumed the given recorded media asset (e.g., three registered users have consumed "Finding Nemo"); an identity of the user who has consumed the given recorded media asset (e.g., Toddler Tom has consumed "Finding Nemo"). In some embodiments, a rule entry may include multiple additional information fields. In such instances, the media guidance application may update a deletion classifier associated with a given recorded given media asset upon determining that all criteria defined by values corresponding to the multiple additional information fields have been fulfilled.

The media guidance application may change a deletion classifier associated with a given recorded multiple times, based on a number of different rule entries included in database 150. As an illustrative example, upon first recording a media asset, the media guidance application may assign, based on a rule entry in database 150, the deletion classifier associated with the recorded media asset to be "Do Not Delete." In some embodiments, the media guidance application may, upon detecting that a user has completely consumed the recorded media asset, determine a level of interest of the user in the recorded media asset. The media guidance application may, upon determining that the user is interested in the recorded media asset, change the deletion classifier associated with the recorded media asset to "O.K. to Delete," because there is a possibility that the user may wish to consume the recorded media asset again. The media guidance application may, upon determining that the user is not interested in the recorded media asset, change the deletion classifier associated with the recorded media asset to "Recommended to Delete," because it is unlikely that the user would wish to consume the recorded media asset again.

In some embodiments, the media guidance application may, upon detecting that a user has completely consumed the recorded media asset, determine an identity of the user. The media guidance application may determine identity of the user based on an unique identifier, such as a string of characters or bio-metric data (e.g., finger print, retina scan, voice recognition or another suitable bio-metric data) received from the user. In some embodiments, the media guidance application may access sensor devices (e.g., image capture devices, motion sensors, wireless signal detectors, and other suitable sensor devices) to determine identity of the user. The media guidance application may compare identity of the user who completely consumed the recorded media with identity (retrieved from memory) of user who recorded the recorded media asset to determine whether the user who recorded the recorded media asset has consumed the recorded media asset. The media guidance application may, upon determining that the user who recorded the recorded media asset has not yet consumed the recorded media asset, refrain from updating the deletion classifier associated with the recorded media asset. The media guidance application may, upon determining that the user who recorded the recorded media asset has consumed the recorded media asset, update the deletion classifier associated with the recorded media asset (e.g., from "Do Not Delete" to "O.K. to Delete" or "Recommended to Delete.").

In some embodiments, the media guidance application may, upon detecting that a user has completely consumed the recorded media asset, determine identity of user(s) who have not yet consumed the recorded media asset. For example, the media guidance application may access a registered users' data structure to determine identity of other users who are authorized access to the recorded media asset. The media guidance application may retrieve, based on a identity of a user who has not yet consumed the recorded media asset, user profile data (e.g., age, parental control settings, viewing preferences and other similar data) associated with user who has not yet consumed the recorded media asset. The media guidance application may compare user profile data of the user who has not yet consumed the recorded media asset with metadata associated with the recorded media asset to determine whether the recorded media asset is of interest and/or suitable for the user who has not yet consumed the recorded media asset. Based on the outcome of the determination, the media guidance application may update deletion classifier associated with the recorded media asset with different values. As an illustrative example, the recorded media asset may be "The Avengers" with parental control rating of PG-13. The media guidance application may, upon determining that the only other authorized user is toddler Tom, who is younger that thirteen years and therefore not suited to watch the "The Avengers." change deletion classifier associated with "The Avengers" to "Recommended to Delete."

In some embodiments, rule entries in database 150 may include an instruction to take into account user media consumption behavior during period of time when a recorded media asset was stored but not consumed. Based on the rule, the media guidance application may, upon determining that "Finding Nemo" has been stored for longer than three months without being watched, retrieve information about the user's media consumption behavior (e.g., by accessing a user history data structure) for that three months. The media guidance application may, upon determining from the user history data that the user has been consuming a less than a threshold amount of media assets, refrain from updating the deletion classifier. The media guidance application may, upon determining from the user history data that the user has been consuming more than a threshold amount of media assets, update the deletion classifier. For example, if the media guidance application determines that user has not been watching media assets during the three months for which "Finding Nemo" was stored, the media guidance application may maintain deletion classifier associated with "Finding Nemo" as "Do Not Delete." For example, if the media guidance application determines that user has been watching other media assets during the three months for which "Finding Nemo" was stored, the media guidance application may update deletion classifier associated with "Finding Nemo" to "Recommended to Delete."

In some embodiments, rule entries in the deletion classification database may have priority values associated with them where a priority value associated with a given rule indicates an importance of the given rule on some predefined scale. In some embodiments, each rule entry of the plurality of rule entries may further include a priority field, where a value corresponding to a priority field associated with a given rule entry defines a priority level associated with the given rule entry. For example, data base may include field priority 162 for storing priority level associated with a given rule entry. As an illustrative example, priority level may be defined on a scale of one to ten, with priority level of ten being most important. For example, rule entry 164, with value of "a user has consumed a portion of recorded media asset that is not an entirety of the recorded media asset" corresponding to trigger event 152, value of "O.K. to Delete" corresponding to initial deletion classifier 156 and value of "Do Not Delete" corresponding to final deletion classifier 158, may have priority value of five corresponding to priority 162. For example, rule entry 170, with value of "user has consumed a portion of recorded media asset that is not an entirety of the recorded media asset" corresponding to trigger event 152, value of "user is not interested in the recorded media asset" corresponding to additional information 154, value of "O.K. to Delete" corresponding to initial deletion classifier 168, and value of "Recommended to Delete" corresponding to final deletion classifier 158 may have a priority value of ten corresponding to priority 162. Thus, in this illustrative example, rule entry 170 is a more important than rule entry 164.

In some embodiments, the deletion classification database may include multiple rule entries that are associated with the same trigger event and initial deletion classifier (e.g., rule entries that have same trigger event and initial deletion classifier but different additional information field values). As an illustrative example, database 150 may include rule entries 164 and 170 that both have a value of "a user has consumed a portion of recorded media asset that is not an entirety of the recorded media asset" corresponding to trigger event 152 and value of "O.K. to Delete" corresponding to initial deletion classifier 156. In such cases, the media guidance application may select the most important rule entry among the multiple rule entries for updating deletion classifier. In some embodiments, querying the deletion classification database for the first rule entry may return multiple rule entries. For example, the media guidance application may query database 150 (e.g., using a SQL SELECT command) for rule entries that are associated with a value of "a user has consumed a portion of recorded media asset that is not an entirety of the recorded media asset" corresponding to trigger event 152 and value of "O.K. to Delete" corresponding to initial deletion classifier 156. The query result may include rule entries 164 and 170, pointers or links to rule entries 164 and 170 or unique identifiers corresponding to rule entries 164 and 170.

The media guidance application may, when determining the first rule entry, determine, based on comparing values corresponding to priority field associated with each rule entry of the multiple rule entries, a rule entry of the multiple rule entries that is associated with the highest priority level. For example, the media guidance application may access rule entry 164 and retrieve value corresponding to priority 162 (e.g., five). The media guidance application may similarly access rule entry 170 and retrieve value corresponding to priority 162 (e.g., ten). The media guidance application may use a comparison function to determine whether priority value associated with rule entry 164 is greater than the priority value associated with rule entry 170. In some embodiments, the media guidance application may, when determining a rule entry that corresponds to the highest priority value, initialize a "maximum priority value" variable to null and a "rule entry to be applied" variable to null. Upon selecting a rule entry, the media guidance application may update the "maximum priority value" variable with priority value associated with the selected rule entry and a "rule entry to be applied" variable with a pointer to the selected rule entry. The media guidance application may then determine whether there is another rule entry that can be selected. Upon determining that there is another rule entry that can be selected, the media guidance application may retrieve a priority value associated with the another rule entry. The media guidance application may compare the priority value associated with the another rule entry with the value of the "maximum priority value" variable to determine whether the another rule entry has a higher priority value (e.g., using a numerical comparison function). In response to determining that the another rule entry has a higher priority value, the media guidance application may update the "maximum priority value" variable with priority value associated with the another rule entry and a "rule entry to be applied" variable with a pointer to the another rule entry. In response to determining that the another rule entry does not have a higher priority value, the media guidance application may determine whether there is any other rule entry that can be selected. The media guidance application may iterate through all available rule entries in a similar fashion. The media guidance application may select the rule entry of the multiple rule entries that is associated with the highest priority level as the first rule entry. Following from the example above, the media guidance application may select rule entry 170 as the first rule entry.

In some embodiments, the media guidance application may determine that, in order to apply the most important rule entry associated with a trigger event and an initial deletion classifier, criterion associated with the most important rule entry has to be fulfilled. The media guidance application may, upon determining that the criterion associated with the most important rule entry is not fulfilled, select the second most important rule entry that is also associated with the trigger event and the initial deletion classifier. In some embodiments, the rule entry of the multiple rule entries that is associated with the highest priority level may further include an additional information field. For example, rule entry 170 may include a value corresponding to additional information 154. The media guidance application may retrieve a value associated with the additional information field. For example, the media guidance application may retrieve value of "user is not interested in the recorded media asset" corresponding to additional information 154 associated with rule entry 170.

The media guidance application may determine, based on the value associated with the additional information field, relevant information required for determining whether a criterion defined by the value of the additional information field is fulfilled. The media guidance application may determine, based on "user is not interested in the recorded media asset," that information that defines the user's interest in "Finding Nemo" is necessary to determine whether the user is interested in "Finding Nemo." In some embodiments, the value associated with the additional information field may include data that defines acceptable relevant information. As an illustrative example, the data that defines acceptable relevant information for "user is not interested in the recorded media asset" may be a value corresponding to "interested in media asset" field associated with a media asset or a score quantifying a user's interest in a media asset. The media guidance application may access a data structure, located at any of storage 608, media content source 716 and media guidance data source 718, containing the relevant information to retrieve the relevant information. For example, the media guidance application may access a user profile data structure, associated with the user, to retrieve a value corresponding to an "interested in media asset" field corresponding to "Finding Nemo." As an illustrative example, the media guidance application may retrieve a "null" value which indicates that there is no information that defines the user's interest in "Finding Nemo."

The media guidance application may compare the value associated with the additional information field with the relevant information to determine whether the criterion defined by the value of the additional information field is fulfilled. For example, the media guidance application may compare the "null" value with "user is not interested in the recorded media asset" by executing an appropriate logic program script to determine whether "null" value corresponds to a user not being interested in a recorded media asset. The media guidance application may, in response to determining that the criterion defined by the value of the additional information field is not fulfilled, select rule entry of the multiple rule entries that is associated with next highest priority level as the first rule entry instead. For example, the media guidance application may determine that a "null" value, which is not included in data that defines acceptable relevant information, provides no information defining the user's interest in "Finding Nemo." and accordingly, does not correspond to the user not being interested in "Finding Nemo." In this case, the media guidance application may select rule entry 164, which is associated with priority value of five, as the first rule entry instead.

In some embodiments, the media guidance application may provide a user information regarding why a given recorded media asset identifier was classified into a specific deletion classifier. In some embodiments, the media guidance application may generate for simultaneous display an identifier corresponding to the recorded media asset, deletion classifier associated with the recorded media asset and a reason for classifying the recorded media asset into the deletion classifier associated with the recorded media asset.

FIG. 2 depicts an illustrative display that the media guidance application may generate for display for providing information regarding why a give recorded media asset identifier was classified into a specific deletion classifier, in accordance with some embodiments of the disclosure. FIG. 2 depicts an illustrative display 200, which may be generated by control circuitry that executes a media guidance application on any user equipment. The functionality of user equipment, control circuitry, and the media guidance application is described in further detail below with respect to FIGS. 4-7. Control circuitry may cause display 200 to be presented using the one or more of the processes described in FIGS. 8-10.

The media guidance application may include in display 200 deletion classifiers 202, 218 and 224 (e.g., "Do Not Delete," "O.K. to Delete." and "Recommended to Delete" in the depicted illustrative example). The media guidance application may generate for display media asset identifiers associated with at least one of the deletion classifiers 202, 218 and 224. For example, the media guidance application may generate for display media asset identifiers 204, 206 and 208 that are associated with deletion classifiers 202, media asset identifiers 220 and 222 that are associated with deletion classifier 218 and media asset identifiers 226, 228 and 230 that are associated with deletion classifier 224. In some embodiments, the media guidance application may spatially organize, in the display, deletion classifiers 202, 218 and 224 and media asset identifiers 204, 206, 208, 220, 222, 226, 228 and 230 such that it is easy to distinguish which media asset identifier is associated with which deletion classifier. In some embodiments, the media guidance application may generate an indicator with each media asset identifier, where the indicator uniquely identifies a deletion classifier associated with a given media asset identifier. Indicator identifying deletion classifier may include, but is not limited to, text (e.g., "Do Not Delete" text listing associated with a given media asset), graphical representation (e.g., a red dot to indicate "Do Not Delete," a yellow dot to indicate "O.K. to Delete." and a green dot to indicate "Recommended to Delete") and audio (e.g., upon receiving a selection of a media asset, playing an audio clip that uniquely identifiers deletion classifier associated with the media asset).

The media guidance application may include in display 200 notification 210 for providing a user information regarding why a given recorded media asset identifier was classified into a specific deletion classifier. As an illustrative example, subsequent to updating a deletion classifier associated with recorded media asset corresponding to media asset identifier 204 (e.g., "Finding Nemo") from "O.K. to Delete" to "Do Not Delete," in response to detecting that a user has watched ten minutes of the recorded media asset corresponding to media asset identifier 204, the media guidance application may generate notification 210 that says "You watched a portion that is not an entirety of Finding Nemo."

In some embodiments, the media guidance application may provide a user an option to change a deletion classifier associated with a recorded media asset. Specifically, the media guidance application may generate for display a plurality of selectable deletion classifier options corresponding to the recorded media asset, where each selectable deletion classifier option of the plurality of selectable deletion classifier options corresponds to a deletion classifier of the plurality of deletion classifiers. As an illustrative example, the media guidance application may include, in display 200, selectable deletion classifier option 212 (e.g., Move to "Recommended to Delete") corresponding to deletion classifier 224 (e.g., "Recommended to Delete"), and selectable deletion classifier option 214 (e.g., Move to "O.K. to Delete") corresponding to deletion classifier 218 (e.g., "O.K. to Delete"). Selectable deletion classifier options 212 and 214 may be associated with media asset identifier 204 (e.g., "Finding Nemo"). The media guidance application may also generate for display selectable option 216 (e.g., delete) to allow a user to select a recorded media asset for deletion. The media guidance application may receive a user selection of a selectable deletion classifier option of the plurality of selectable deletion classifier options. For example, the media guidance application may receive, via user input interface 610, a selection of selectable deletion classifier options 212 associated with media asset identifier 204.

The media guidance application may access a data structure that contains information about mapping between the plurality of selectable deletion classifier options and the plurality of deletion classifiers to determine a deletion classifier corresponding to the selected selectable deletion classifier option. For example, the media guidance application may access a look-up table, located at any of storage 608, media content source 716 and media guidance data source 718, that defines relationship between selectable deletion classifier options and the plurality of deletion classifiers to determine which deletion classifier selectable deletion classifier option 212 corresponds to. The media guidance application may retrieve the deletion classifier corresponding to the selected selectable deletion classifier option. For example, the media guidance application may retrieve deletion classifier 224 (e.g., "Recommended to Delete") that corresponds to selectable deletion classifier option 212. The media guidance application may update the recorded media asset properties data structure by substituting the second deletion classifier associated with the deletion classifier corresponding to the selected selectable deletion classifier option. For example, the media guidance application may determine, in manners described previously in regards to retrieving specific data, that entry 110 in data structure is associated with media asset identifier 204. The media guidance application may update, for entry 110, value corresponding to deletion classifier 108 from "Do Not Delete" to "Recommended to Delete."

FIG. 3 depicts an illustrative display that the media guidance application may generate for display for informing a user that certain recorded media assets will be automatically deleted, in accordance with some embodiments of the disclosure. FIG. 3 depicts an illustrative display 300, which may be generated by control circuitry that executes a media guidance application on any user equipment. The functionality of user equipment, control circuitry, and the media guidance application is described in further detail below with respect to FIGS. 4-7. Control circuitry may cause display 300 to be presented using the one or more of the processes described in FIGS. 8-10.

In some embodiments, the media guidance application may automatically delete recorded media assets associated with a specific deletion classifier after some predefined period of time has elapsed. Specifically, the media guidance application may select recorded media assets associated with a third deletion classifier of the plurality of deletion classifiers for automatic deletion after a pre-defined period of time has elapsed. For example, the media guidance application may select all recorded media assets (e.g., Beauty and the Beast, The Avengers and National Treasure) associated with the "Recommended to Delete" deletion classifier for automatic deletion after seventy two hours has elapsed from a current time (e.g., Dec. 4, 12:00 A.M.). The media guidance application may store, either locally at storage 608 or remotely at media content source 716 and media guidance data source 718, a "deletion time" variable that corresponds to a date and time when the recorded media assets selected for automatic deletion should be automatically deleted. Following from the example above, the media guidance application may store a value that is a sum of seventy two hours and the current time (i.e., Dec. 7, 12:00 A.M.) in the "deletion time" variable.

The media guidance application may generate for display a recommendation to consume the recorded media assets associated with the third deletion classifier before the pre-defined period of time has elapsed. For example, the media guidance application may generate for display notification 302 (e.g., "the listed media assets will be deleted on Dec. 7, 12:00 A.M. Watch the media assets before they are deleted"). The media guidance application may display media asset identifiers 304, 306 and 308 (e.g., Beauty and the Beast, The Avengers and National Treasure respectively) corresponding to recorded media assets associated with the third deletion classifier. The media guidance application may also include, in display 300, selectable options for receiving user input to perform a specific action related to any of media asset identifiers 304, 306 and 308. For example, the media guidance application may display selectable options 310, 312, 314 and 316 (e.g., "Watch," "Move to 'Do not Delete'," "Move to 'O.K. to Delete'," and "Delete Now" respectively).

The media guidance application may receive a data packet containing information that the pre-defined period of time has elapsed. For example, the media guidance application may receive a data packet containing a date and time stamp of a current date and time (e.g., Dec. 7, 12:00 A.M). The media guidance application may determine, by using a Boolean comparison function to compare the date and time stamp for the current date and time with value of the "deletion time" variable, that seventy-two hours from Dec. 4, 12:00 A.M. has elapsed. The media guidance application may, in response to receiving the data packet containing information that the pre-defined period of time has elapsed, automatically delete the recorded media assets associated with the third deletion classifier. For example, the media guidance application may set "Delete" flags associated with recorded media assets corresponding to media asset identifiers 304, 306 and 308 to "true." The media guidance application may subsequently automatically delete recorded media assets corresponding to media asset identifiers 304, 306 and 308.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content. Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be stored, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device." "electronic device." "electronic equipment." "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 4:
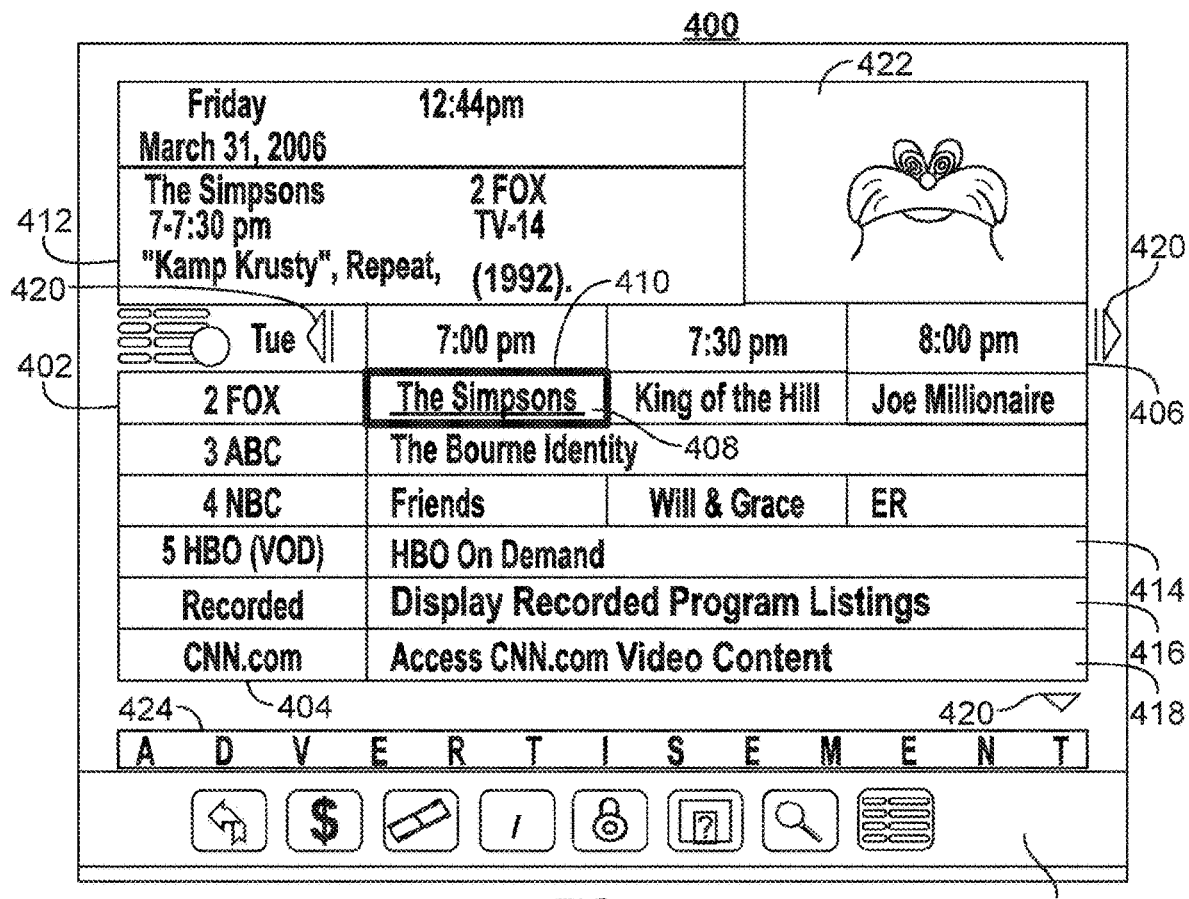
FIG. 4 shows an illustrative embodiment of a display screen that may be used to provide media guidance application listings and other media guidance information, in accordance with some embodiments of the disclosure.
Figure 5:
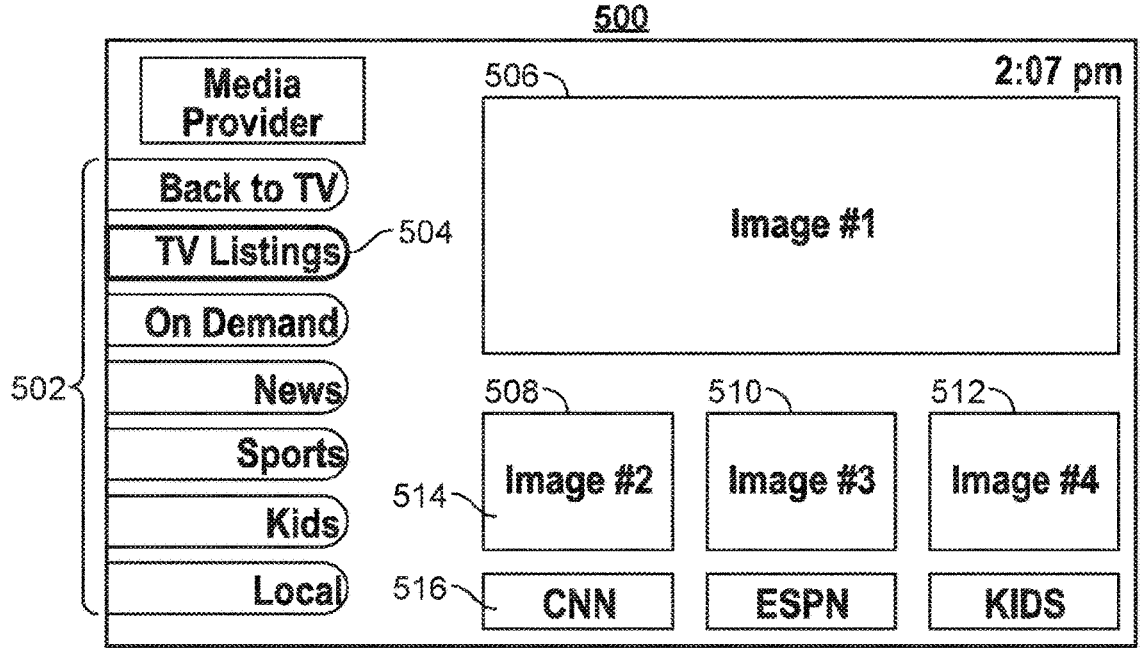
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, advertisement 424, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 424 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 402. Advertisement 424 may also be for products or services related or unrelated to the content displayed in grid 402. Advertisement 424 may be selectable and provide further information about content, provide information about a product or a service, enable purchasing of content, a product, or a service, provide content relating to the advertisement, etc. Advertisement 424 may be targeted based on a user's profile/preferences, monitored user activity, the type of display provided, or on other suitable targeted advertisement bases.

While advertisement 424 is shown as rectangular or banner shaped, advertisements may be provided in any suitable size, shape, and location in a guidance application display. For example, advertisement 424 may be provided as a rectangular shape that is horizontally adjacent to grid 402. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
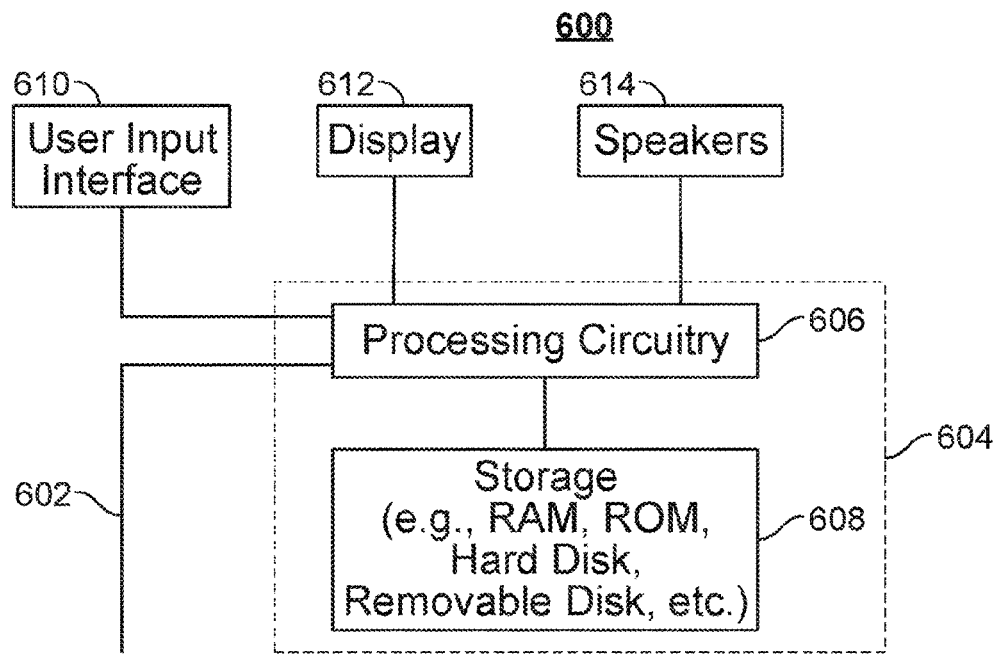
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming. Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors. microcontrollers, digital signal processors, programmable logic devices, field-programmable gate arrays (FPGAs), application-specific integrated circuits (ASICs), etc. . . . and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders. BLU- RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
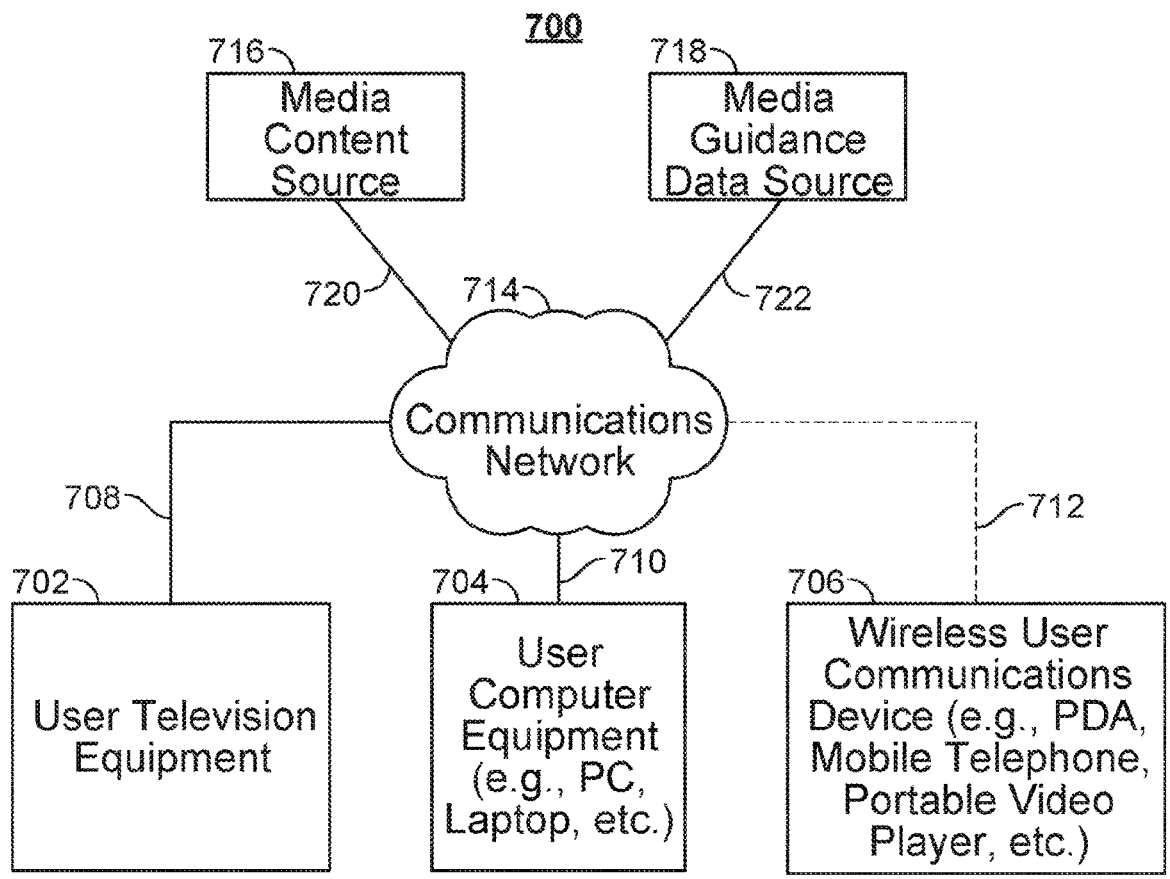
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some user television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG. INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al, U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. U.S. Pat. No. 8,046,801, issued Oc. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
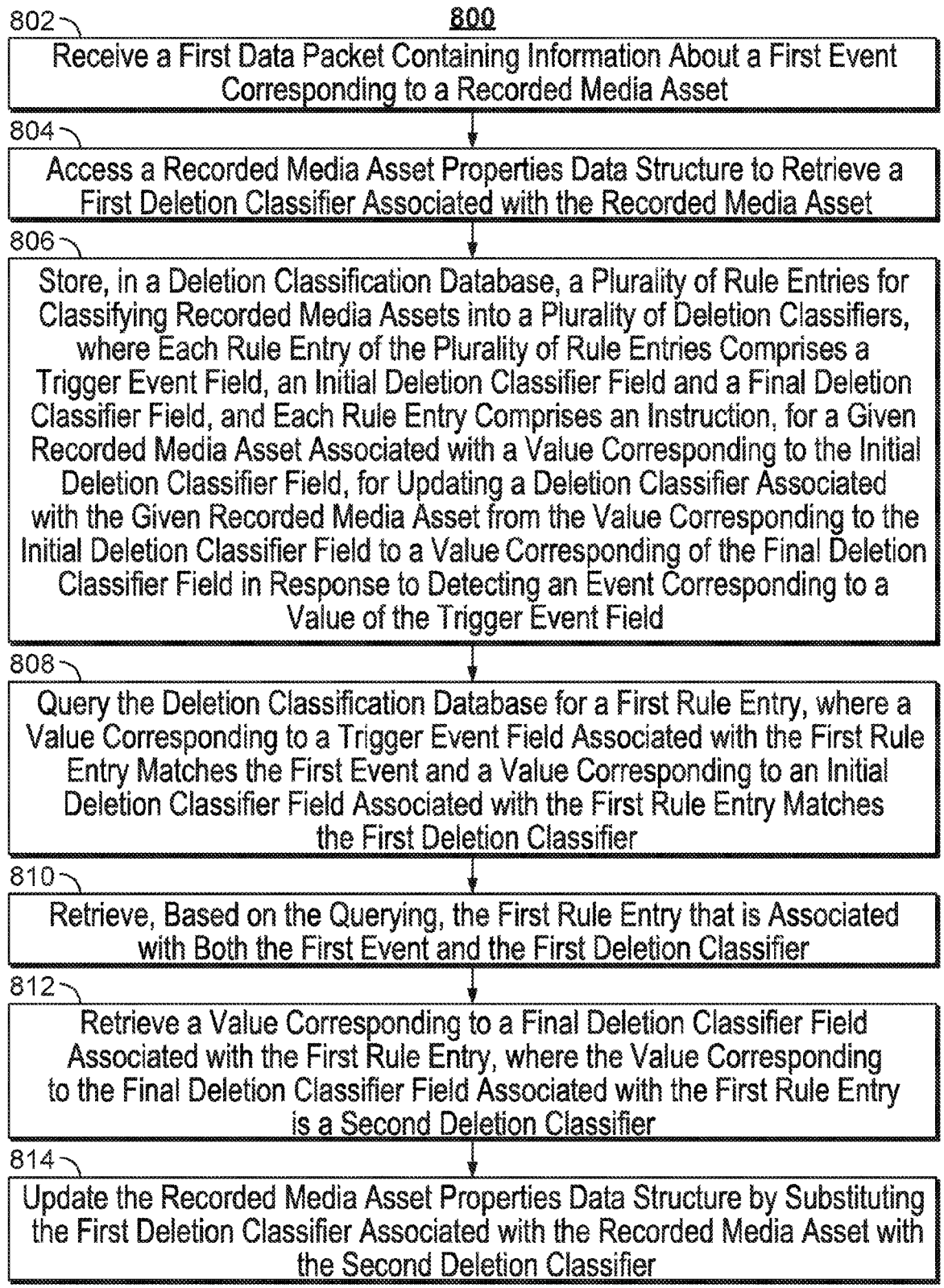
FIG. 8 is a flowchart of illustrative steps involved in classifying a recorded content for deletion, in accordance with some embodiments of the disclosure.

FIG. 8 is a flowchart of illustrative steps involved in classifying a recorded content for deletion, in accordance with some embodiments of the disclosure. Process 800 may be executed by control circuitry 604 (FIG. 6) as instructed by the media guidance application. Control circuitry 604 may be implemented on user equipment 702, 704, and/or 706 (FIG. 7). In addition, one or more steps of process 800 may be incorporated into or combined with one or more steps of any other process or embodiment.

Process 800 begins at 802 where control circuitry 604 receives a first data packet containing information about a first event corresponding to a recorded media asset. For example, control circuitry 604 may receive a data packet containing information that a user has watched a portion but not an entirety of "Finding Nemo" (e.g., ten minutes of playback time). Process 800 continues to 804 where control circuitry 604 accesses a recorded media asset properties data structure to retrieve a first deletion classifier associated with the recorded media asset. For example, media guidance application may access, in data structure 100, entry 110 that is associated with recorded media asset "Finding Nemo," and retrieve value corresponding to deletion classifier 108 (e.g., "O.K. to Delete").

Process 800 continues to 806 where control circuitry 604 stores, in a deletion classification database, a plurality of rule entries for classifying recorded media assets into a plurality of deletion classifiers, where each rule entry of the plurality of rule entries comprises a trigger event field, an initial deletion classifier field and a final deletion classifier field, and each rule entry comprises an instruction, for a given recorded media asset associated with a value corresponding to the initial deletion classifier field, for updating a deletion classifier associated with the given recorded media asset from the value corresponding to the initial deletion classifier field to a value corresponding to the final deletion classifier field in response to detecting an event corresponding to a value of the trigger event field. For example, control circuitry 604 may store rule entries 164, 166, 168 and 170 in database 150. Rule entries 164, 166, 168 and 170 may include values corresponding to fields trigger event 152, initial deletion classifier 156, final deletion classifier 158 and instruction 160.

Process 800 continues to 808 where control circuitry 604 queries the deletion classification database for a first rule entry, where a value corresponding to a trigger event field associated with the first rule entry matches the first event and a value corresponding to an initial deletion classifier field associated with the first rule entry matches the first deletion classifier. As an illustrative example, control circuitry 604 may query, by performing actions described previously with respect to FIGS. 1A-1C, database 150 for a rule entry that has a value corresponding to trigger event 152 of "a user has consumed a portion of recorded media asset that is not an entirety of the recorded media asset" and a value corresponding to initial deletion classifier 156 of "O.K. to Delete." Process 800 continues to 810 where control circuitry 604 retrieves, based on the querying, the first rule entry that is associated with both the first event and the first deletion classifier. For example, control circuitry 604 may retrieve rule entry 164 that is associated with both trigger event field value of "a user has consumed a portion of recorded media asset that is not an entirety of the recorded media asset" and initial deletion classifier field value of "O.K. to Delete."

Process 800 continues to 812 where control circuitry 604 retrieves a value corresponding to a final deletion classifier field associated with the first rule entry, where the value corresponding to the final deletion classifier field associated with the first rule entry is a second deletion classifier. For example, control circuitry 604 may retrieve "Do Not Delete" corresponding to final deletion classifier 158 associated with rule entry 164. Process 800 continues to 814 where control circuitry 604 updates the recorded media asset properties data structure by substituting the first deletion classifier associated with the recorded media asset with the second deletion classifier. For example, control circuitry 604 may update entry 110 associated with "Finding Nemo" by substituting "O.K. to Delete" deletion classifier with "Do Not Delete."

Figure 9:
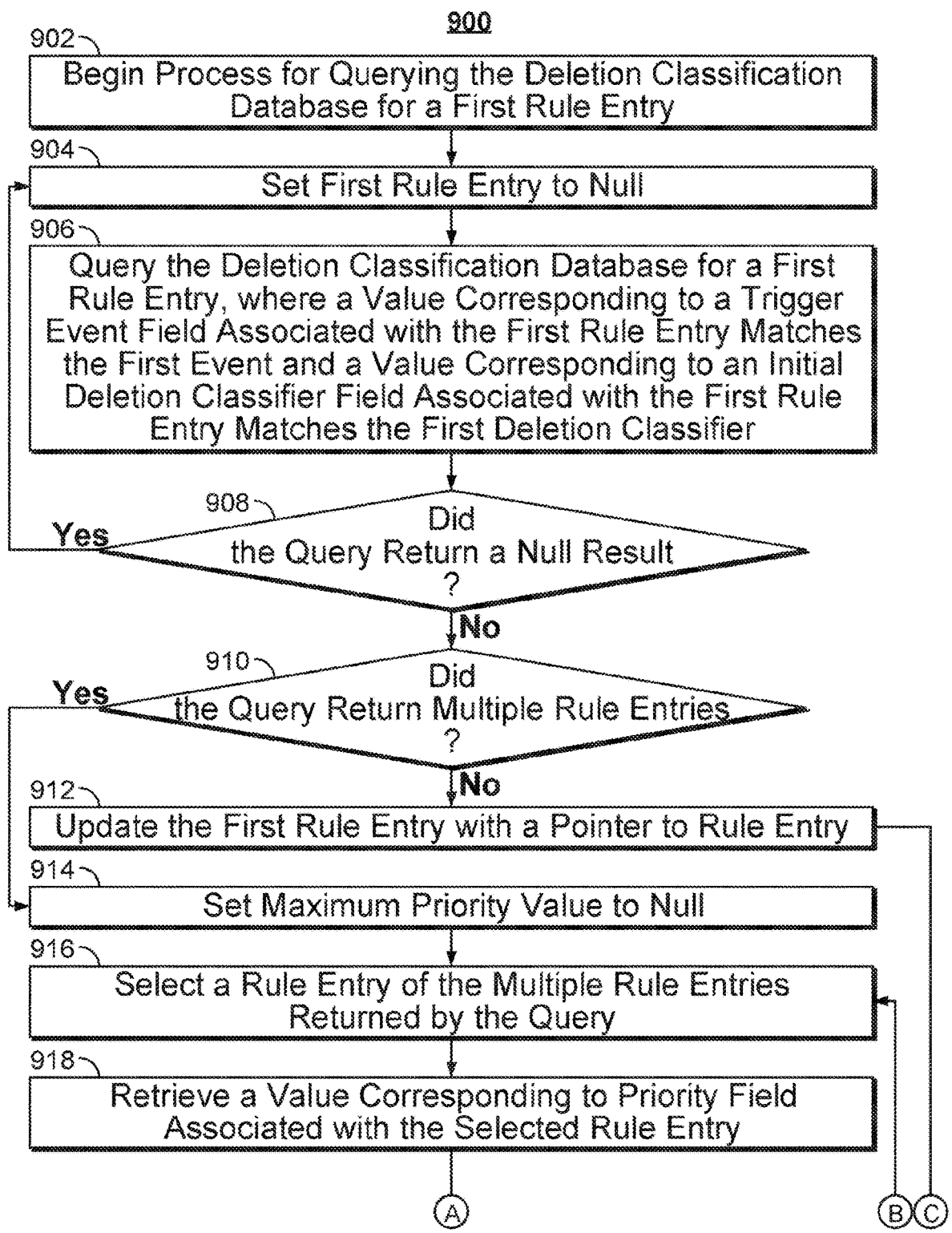
FIG. 9 is a flowchart of illustrative steps involved in retrieving a first rule entry, in accordance with some embodiments of the disclosure.
Figure 9:
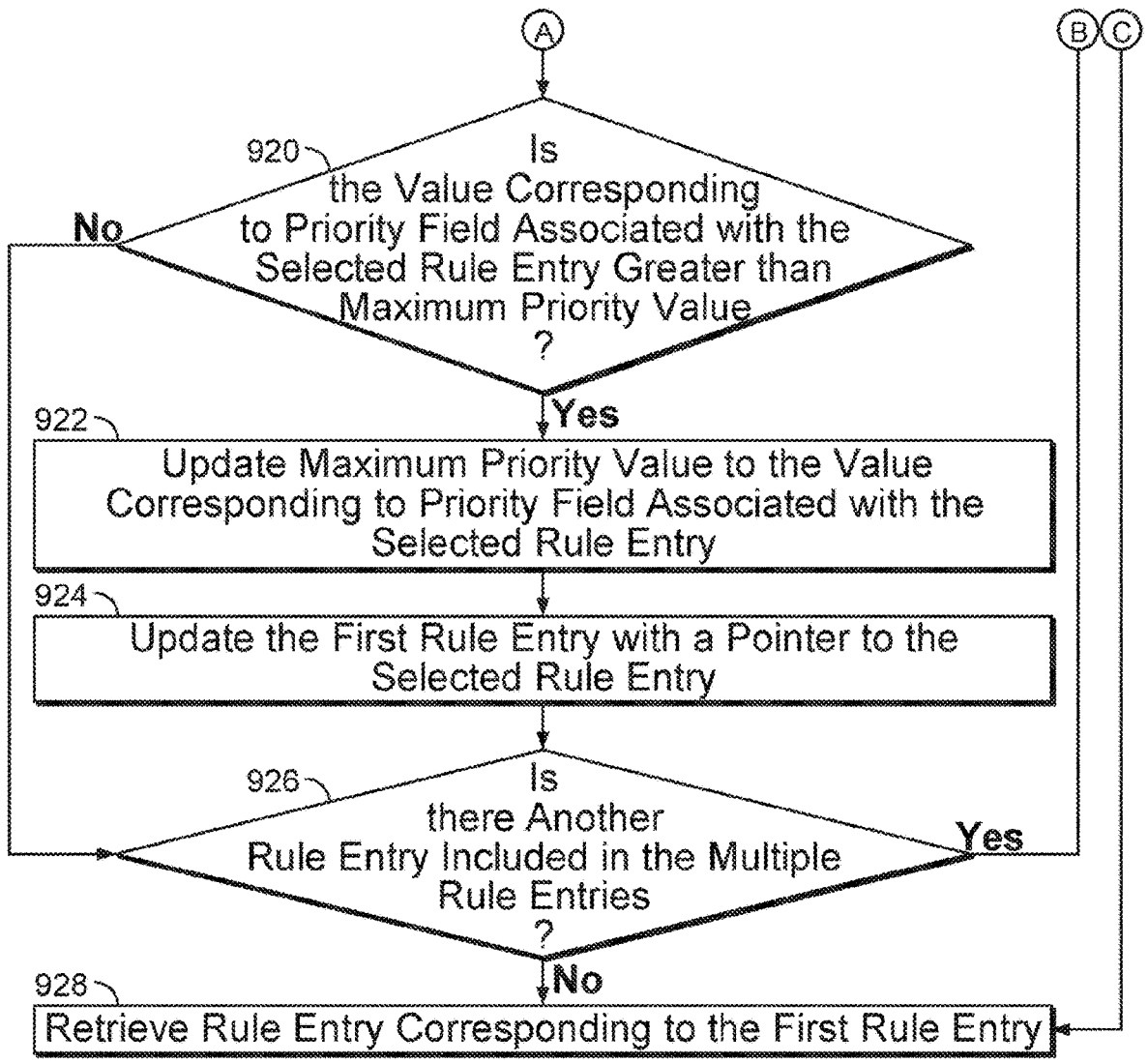

FIG. 9 is a flowchart of illustrative steps involved in retrieving a first rule entry, in accordance with some embodiments of the disclosure. Process 900 may be executed by control circuitry 604 (FIG. 6) as instructed by the media guidance application. Control circuitry 604 may be implemented on user equipment 702, 704, and/or 706 (FIG. 7). In addition, one or more steps of process 900 may be incorporated into or combined with one or more steps of any other process or embodiment.

Process 900 begins at 902 where control circuitry 604 begins process for querying the deletion classification database for a first rule entry. Process 900 continues to 904 where control circuitry 604 sets first rule entry to null. For example, control circuitry 604 may perform an initialization operation and set value of a first rule entry variable to null. Process 900 continues to 906 where control circuitry 604 queries the deletion classification database for a first rule entry, where a value corresponding to a trigger event field associated with the first rule entry matches the first event and a value corresponding to an initial deletion classifier field associated with the first rule entry matches the first deletion classifier. As an illustrative example, control circuitry 604 may query, in manners described previously with respect to FIGS. 1A-1C, database 150 for rule entries that are associated with a value of "a user has consumed a portion of recorded media asset that is not an entirety of the recorded media asset" corresponding to trigger event 152 and value of "O.K. to Delete" corresponding to initial deletion classifier 156.

Process 900 continues to 908 where control circuitry 604 determines whether the query returned a null result. For example, control circuitry 604 may use a Boolean comparison function (e.g., If query result=="null," null result=true) to determine whether the query returned a null result. If, at 908, control circuitry 604 determines that the query returned a null result, process 900 reverts to 904. If, at 908, control circuitry 604 determines that the query did not return a null result, process 900 continues to 910. At 910, control circuitry 604 determines whether the query returned multiple rule entries. If, at 910, control circuitry 604 determines that the query did not return multiple rule entries, process 900 continues to 912. At 912, control circuitry 604 updates the first rule entry with a pointer to rule entry. Process 900 continues to 928 where control circuitry 604 retrieves rule entry corresponding to the first rule entry.

If, at 910, control circuitry 604 determines that the query returned multiple rule entries, process 900 continues to 914. For example, control circuitry 604 may determine that the query result includes rule entries 164 and 170. At 914, control circuitry 604 sets maximum priority value to null. Process 900 continues to 916 where control circuitry 604 selects a rule entry of the multiple rule entries returned by the query. For example, control circuitry 604 may select rule entry 164. Process 900 continues to 918 where control circuitry 604 retrieves a value corresponding to priority field associated with the selected rule entry. For example, control circuitry 604 may retrieve, for rule entry 164, value (e.g., five) corresponding to field priority 162. Process 900 continues to 920 where control circuitry 604 determines whether the value corresponding to priority field associated with the selected rule entry is greater than maximum priority value. If, at 920, control circuitry 604 determines that the value corresponding to priority field associated with the selected rule entry is greater than maximum priority value, process 900 continues to 922. As an illustrative example, maximum priority value may be null and control circuitry 604 may determine that priority value (e.g., five) associated with rule 164 is greater than the maximum priority value. At 922, control circuitry 604 updates maximum priority value to the value corresponding to priority field associated with the selected rule entry. Following from the example above, control circuitry 604 may update maximum priority value to priority value associated with rule 164 (i.e., five).

Process 900 continues to 924 where control circuitry 604 updates the first rule entry with a pointer to the selected rule entry. For example, control circuitry 604 may update first rule entry with pointer to rule entry 164. Process 900 continues to 926 where control circuitry 604 determines whether there is another rule entry included in the multiple rule entries. Process 900 also continues to 926 if, at 920, control circuitry 604 determines that the value corresponding to priority field associated with the selected rule entry is not greater than maximum priority value. If, at 926, control circuitry 604 determines that there is another rule entry included in the multiple rule entries, process 900 reverts to 916. For example, control circuitry 604 may determine that rule 174 is also included in the multiple rule entries. If, at 926, control circuitry 604 determines that there is no other rule entry included in the multiple rule entries, process 900 continues to 928. At 928, control circuitry 604 retrieves rule entry corresponding to the first rule entry.

Figure 10:
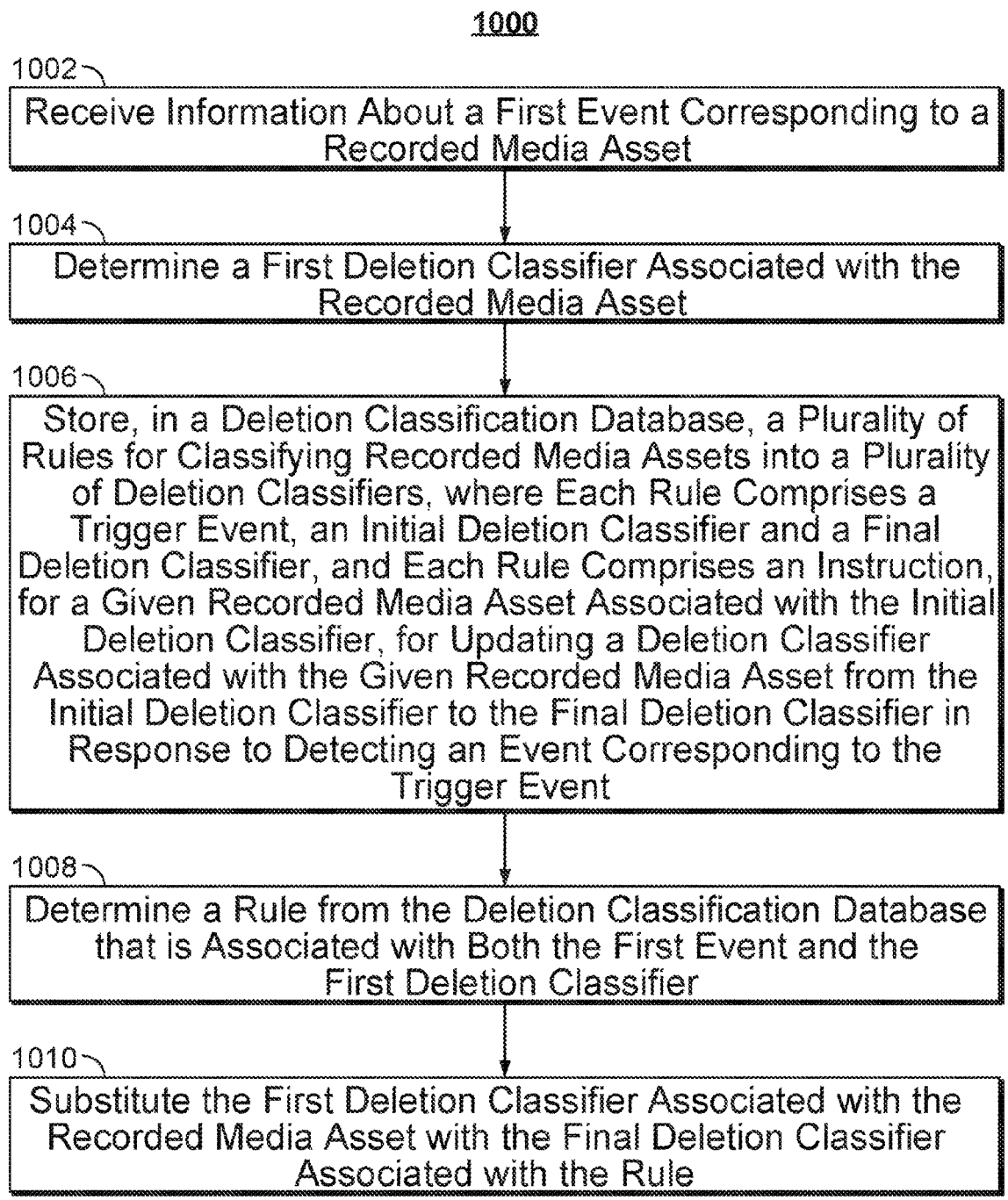
FIG. 10 is a flowchart of illustrative steps involved in classifying a recorded media asset into a deletion classifier, in accordance with some embodiments of the disclosure.

FIG. 10 is a flowchart of illustrative steps involved in classifying a recorded media asset into a deletion classifier, in accordance with some embodiments of the disclosure. Process 1000 may be executed by control circuitry 604 (FIG. 6) as instructed by the media guidance application. Control circuitry 604 may be implemented on user equipment 702, 704, and/or 706 (FIG. 7). In addition, one or more steps of process 1000 may be incorporated into or combined with one or more steps of any other process or embodiment.

Process 1000 begins at 1002 where control circuitry 604 receives information about a first event corresponding to a recorded media asset. For example, control circuitry 604 may receive a data packet containing information that a user has watched a portion but not an entirety of "Finding Nemo" (e.g., ten minutes of playback time). Process 1000 continues to 1004 where control circuitry 604 determines a first deletion classifier associated with the recorded media asset. For example, media guidance application may access data structure 100 and determine "O.K. to Delete" deletion classifier is associated with "Finding Nemo."

Process 1000 continues to 1006 where control circuitry 604 stores, in a deletion classification database, a plurality of rules for classifying recorded media assets into a plurality of deletion classifiers, where each rule comprises a trigger event, an initial deletion classifier and a final deletion classifier, and each rule comprises an instruction, for a given recorded media asset associated with the initial deletion classifier, for updating a deletion classifier associated with the given recorded media asset from the initial deletion classifier to the final deletion classifier in response to detecting an event corresponding to the trigger event. For example, control circuitry 604 may store rule entries 164, 166, 168 and 170 in database 150. Rule centric 164, 166, 168 and 170 may include values corresponding to fields trigger event 152, initial deletion classifier 156, final deletion classifier 158 and instruction 160.

Process 1000 continues to 1008 where control circuitry 604 determines a rule from the deletion classification database that is associated with both the first event and the first deletion classifier. As an illustrative example, control circuitry 604 may determine, in manners described previously with respect to FIGS. 1A-IC, rule entry 164 is associated with both first event of "a user has consumed a portion of recorded media asset that is not an entirety of the recorded media asset" and first deletion classifier of "O.K. to Delete." Process 1000 continues to 1010 where control circuitry 604 substitutes the first deletion classifier associated with the recorded media asset with the final deletion classifier associated with the rule. For example, control circuitry 604 may determine, in manners described previously with respect to FIGS. 1A-1C, that the final deletion classifier associated with rule entry 164 is "Do Not Delete." Control circuitry 604 may substitute "O.K. to Delete" deletion classifier, associated with "Finding Nemo," by substituting "O.K. to Delete" with "Do Not Delete."

It should be noted that processes 800-1000 or any step thereof could be performed on, or provided by, any of the devices shown in FIGS. 6-7. For example, any of processes 800-1000 may be executed by control circuitry 604 (FIG. 6) as instructed by the media guidance application implemented on user equipment 702, 704, and/or 706 (FIG. 7). In addition, one or more steps of process 800-10000 may be incorporated into or combined with one or more steps of any other process or embodiment.

It is contemplated that the steps or descriptions of FIGS. 8-10 may be used with any other embodiment of this disclosure. In addition, the steps and descriptions described in relation to FIG. 8-10 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment May be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   storing a first deletion classifier associated with a recorded media asset;
   determining that an event associated with the recorded media asset corresponds to a stored rule;
   in response to the determining that the event associated with the recorded media asset corresponds to the stored rule, updating the first deletion classifier to a second deletion classifier based on the stored rule; and
   generating, for display, the second deletion classifier, a media asset identifier of the recoded media asset, and a notification comprising a reason for updating the first deletion classifier to the second deletion classifier.

2. The method of claim 1, wherein the event comprises a version of the recorded media asset being available through a media consumption platform associated with a user, and
   wherein the notification comprises an indication that the version of the recorded media asset is available through the media consumption platform.

3. The method of claim 1, wherein the event comprises consumption of a portion of the recorded media asset, and
   wherein the notification comprises the consumption of the portion of the recorded media asset.

4. The method of claim 1, wherein the event comprises consumption of a portion of a version of the recorded media asset that is available from a different source, and
   wherein the notification comprises an indication of the consumption of the portion of the version of the recorded media asset was consumed from the different source.

5. The method of claim 1, further comprising:
   generating, for display, one or more additional media asset identifiers associated with a same deletion classifier as the second deletion classifier that are spatially organized to be associated with the second deletion classifier.

6. The method of claim 1, further comprising:
   generating, for display, one or more selectable options to change the second deletion classifier associated with the recorded media asset.

7. The method of claim 1, further comprising:
   generating, for display, at least one other deletion classifier and at least one other media asset identifier associated with the at least one other deletion classifier, the at least one other media asset identifier being spatially organized to be associated with the at least one other deletion classifier.

8. The method of claim 1, wherein the stored rule comprises a trigger event, an initial deletion classifier, and a final deletion classifier.

9. The method of claim 8, wherein the determining that the event associated with the recorded media asset corresponds to the stored rule comprises:
   identifying the event associated with the recorded media asset matches the trigger event of the stored rule.

10. The method of claim 8, wherein the updating the first deletion classifier to the second deletion classifier based on the stored rule comprises:
    updating the first deletion classifier from the initial deletion classifier to the final deletion classifier of the stored rule.

11. A system comprising:
    control circuitry configured to:
       store a first deletion classifier associated with a recorded media asset;
       determine that an event associated with the recorded media asset corresponds to a stored rule; and
       in response to the determining that the event associated with the recorded media asset corresponds to the stored rule, updating the first deletion classifier to a second deletion classifier based on the stored rule; and
    input/output circuitry configured to:
       generate, for display, the second deletion classifier, a media asset identifier of the recoded media asset, and a notification comprising a reason for updating the first deletion classifier to the second deletion classifier.

12. The system of claim 11, wherein the event comprises a version of the recorded media asset being available through a media consumption platform associated with a user, and
    wherein the notification comprises an indication that the version of the recorded media asset is available through the media consumption platform.

13. The system of claim 11, wherein the event comprises consumption of a portion of the recorded media asset, and
    wherein the notification comprises the consumption of the portion of the recorded media asset.

14. The system of claim 11, wherein the event comprises consumption of a portion of a version of the recorded media asset that is available from a different source, and
    wherein the notification comprises an indication of the consumption of the portion of the version of the recorded media asset was consumed from the different source.

15. The system of claim 11, wherein the input/output circuitry is further configured to:
    generate, for display, one or more additional media asset identifiers associated with a same deletion classifier as the second deletion classifier that are spatially organized to be associated with the second deletion classifier.

16. The system of claim 11, wherein the input/output circuitry is further configured to:
    generate, for display, one or more selectable options to change the second deletion classifier associated with the recorded media asset.

17. The system of claim 11, wherein the input/output circuitry is further configured to:
    generate, for display, at least one other deletion classifier and at least one other media asset identifier associated with the at least one other deletion classifier, the at least one other media asset identifier being spatially organized to be associated with the at least one other deletion classifier.

18. The system of claim 11, wherein the stored rule comprises a trigger event, an initial deletion classifier, and a final deletion classifier.

19. The system of claim 18, wherein the control circuitry is configured to determine that the event associated with the recorded media asset corresponds to the stored rule by:

identifying the event associated with the recorded media asset matches the trigger event of the stored rule.

20. The system of claim 18, wherein the control circuitry is configured to update the first deletion classifier to the second deletion classifier based on the stored rule by:
updating the first deletion classifier from the initial deletion classifier to the final deletion classifier of the stored rule.

* * * * *